US012457196B2

(12) United States Patent
Wondra

(10) Patent No.: US 12,457,196 B2
(45) **Date of Patent: *Oct. 28, 2025**

(54) SECURE PRIVATE TRAFFIC EXCHANGE IN A UNIFIED NETWORK SERVICE

(71) Applicant: CLOUDFLARE, INC., San Francisco, CA (US)

(72) Inventor: Nicholas Alexander Wondra, Savoy, IL (US)

(73) Assignee: CLOUDFLARE, INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/521,351

(22) Filed: Nov. 28, 2023

(65) Prior Publication Data

US 2024/0098061 A1 Mar. 21, 2024

Related U.S. Application Data

(60) Continuation of application No. 17/977,381, filed on Oct. 31, 2022, now Pat. No. 11,831,607, which is a (Continued)

(51) Int. Cl.

*H04L 9/40* (2022.01)
*H04L 12/46* (2006.01)
*H04L 67/10* (2022.01)

(52) U.S. Cl.

CPC ...... *H04L 63/0236* (2013.01); *H04L 12/4633* (2013.01); *H04L 63/0272* (2013.01);

(Continued)

(58) Field of Classification Search

CPC ............ H04L 63/0236; H04L 63/0272; H04L 63/029; H04L 63/0485; H04L 67/10;

(Continued)

(56) References Cited

U.S. PATENT DOCUMENTS

| | | | | |
|---|---|---|---|---|
| 7,386,630 B2 * | 6/2008 | Liong | ................. | H04L 41/0894 709/236 |
| 7,526,541 B2 | 4/2009 | Roese et al. | | |

(Continued)

FOREIGN PATENT DOCUMENTS

| | | |
|---|---|---|
| EP | 2748991 A1 | 7/2014 |
| KR | 10-2015-0023620 A | 3/2015 |

(Continued)

OTHER PUBLICATIONS

International Search Report and Written Opinion, PCT App. No. PCT/US2022/021409, Jun. 30, 2022, 10 pages.

(Continued)

*Primary Examiner* — David Garcia Cervetti
(74) *Attorney, Agent, or Firm* — NICHOLSON DE VOS WEBSTER & ELLIOTT LLP

(57) ABSTRACT

Traffic is received at an interface of a compute server. Identity information associated with the traffic is determined including an identifier of a customer to which the traffic is attributable. An egress policy configured for the first customer is used to determine whether the traffic is allowed to be transmitted to a destination where that destination is a resource of a second customer. If the traffic is allowed to be transmitted, the traffic and identity information is transmitted over a cross-customer GRE tunnel to a namespace of the second costumer on the compute server. An ingress policy configured for the second customer is used to determine whether the traffic is allowed to be transmitted to the destination, and if it is, then the traffic is transmitted.

24 Claims, 13 Drawing Sheets

Related U.S. Application Data division of application No. 17/700,058, filed on Mar. 21, 2022, now Pat. No. 11,677,717.

(60) Provisional application No. 63/321,757, filed on Mar. 20, 2022, provisional application No. 63/286,520, filed on Dec. 6, 2021, provisional application No. 63/164,492, filed on Mar. 22, 2021.

(52) U.S. Cl.
CPC ........ *H04L 63/029* (2013.01); *H04L 63/0485* (2013.01); *H04L 67/10* (2013.01)

(58) Field of Classification Search
CPC ............. H04L 12/4633; H04L 61/2514; H04L 61/2535; H04L 63/0281; H04L 63/102; H04L 67/02; H04L 67/143; H04L 67/56; H04L 69/162; H04L 69/22; H04L 69/321; H04L 69/325; H04L 69/326; H04L 12/4641
See application file for complete search history.

(56) References Cited

U.S. PATENT DOCUMENTS

| | | | | |
|---|---|---|---|---|
| 7,739,372 | B2 | 6/2010 | Roese et al. | |
| 9,112,911 | B1 * | 8/2015 | Karhade | H04L 63/102 |
| 9,350,710 | B2 | 5/2016 | Herle et al. | |
| 9,571,458 | B1 | 2/2017 | Melam et al. | |
| 9,794,107 | B2 | 10/2017 | Gaglianello et al. | |
| 9,948,552 | B2 | 4/2018 | Teng et al. | |
| 9,948,675 | B2 * | 4/2018 | Nakamoto | H04L 63/0823 |
| 10,103,892 | B2 * | 10/2018 | Grobman | H04L 63/123 |
| 10,630,725 | B2 | 4/2020 | Nakamoto et al. | |
| 10,819,630 | B1 | 10/2020 | Panchal et al. | |
| 10,833,891 | B2 * | 11/2020 | Sung | H04L 45/123 |
| 11,128,491 | B2 * | 9/2021 | Wondra | H04L 12/4633 |
| 11,360,799 | B2 | 6/2022 | Liu et al. | |
| 11,425,216 | B2 * | 8/2022 | Branch | H04L 67/63 |
| 11,477,634 | B2 | 10/2022 | Weniger et al. | |
| 11,677,717 | B2 * | 6/2023 | Wondra | H04L 61/2535 726/13 |
| 11,765,146 | B2 | 9/2023 | Mestery et al. | |
| 11,784,912 | B2 * | 10/2023 | Ehrat | H04L 45/44 |
| 2004/0010712 | A1 * | 1/2004 | Hui | H04L 63/0254 713/154 |
| 2004/0103321 | A1 * | 5/2004 | Wesinger, Jr. | H04L 63/0227 707/E17.116 |
| 2008/0080493 | A1 * | 4/2008 | Weintraub | H04L 63/0263 370/389 |
| 2008/0165964 | A1 | 7/2008 | Lewis et al. | |
| 2009/0190591 | A1 | 7/2009 | Sankaran | |
| 2010/0325697 | A1 * | 12/2010 | Terzis | H04L 63/0272 726/3 |
| 2011/0107413 | A1 * | 5/2011 | Chawla | H04L 63/0227 726/12 |
| 2011/0231907 | A1 | 9/2011 | Smith | |
| 2013/0166709 | A1 * | 6/2013 | Doane | H04L 45/02 709/223 |
| 2013/0219486 | A1 | 8/2013 | Work et al. | |
| 2013/0287026 | A1 | 10/2013 | Davie | |
| 2014/0153422 | A1 | 6/2014 | Nambiar et al. | |
| 2015/0082301 | A1 * | 3/2015 | Garg | G06F 9/45533 718/1 |
| 2015/0350314 | A1 * | 12/2015 | Miller | H04L 69/329 709/203 |
| 2018/0063160 | A1 * | 3/2018 | Kumar | G06F 21/53 |
| 2018/0288726 | A1 | 10/2018 | Azgin et al. | |
| 2019/0156054 | A1 * | 5/2019 | Lim | H04L 61/251 |
| 2020/0092194 | A1 * | 3/2020 | Tillotson | H04L 47/2483 |
| 2020/0092252 | A1 * | 3/2020 | Tillotson | G06F 9/45558 |
| 2021/0058271 | A1 | 2/2021 | Sung et al. | |
| 2022/0070154 | A1 | 3/2022 | Mestery et al. | |
| 2022/0103523 | A1 | 3/2022 | Starr et al. | |
| 2024/0314106 | A1 * | 9/2024 | Tuber | H04L 63/0236 |

FOREIGN PATENT DOCUMENTS

| | | | |
|---|---|---|---|
| WO | 2013/154813 | A1 | 10/2013 |
| WO | 2020/112448 | A1 | 6/2020 |

OTHER PUBLICATIONS

Non-Final Office Action, U.S. Appl. No. 17/700,058, Sep. 22, 2022, 12 pages.

Non-Final Office Action, U.S. Appl. No. 17/977,391, Oct. 23, 2023, 13 pages.

Non-Final Office Action, U.S. Appl. No. 18/326,745, Dec. 8, 2023, 30 pages.

Notice of Allowance, U.S. Appl. No. 17/700,058, Jan. 30, 2023, 9 pages.

Notice of Allowance, U.S. Appl. No. 17/977,381, Jul. 19, 2023, 11 pages.

Notice of Allowance, U.S. Appl. No. 17/977,391, Jan. 24, 2024, 10 pages.

Notice of Allowance, U.S. Appl. No. 17/977,391, May 8, 2024, 9 pages.

Notice of Allowance, U.S. Appl. No. 18/326,745, May 29, 2024, 8 pages.

European Search Report and Search Opinion , EP App. No. 22776515.3, Jan. 7, 2025, 7 pages.

* cited by examiner

SECURE PRIVATE TRAFFIC EXCHANGE IN A UNIFIED NETWORK SERVICE

CROSS-REFERENCE TO RELATED APPLICATIONS

This application is a continuation of U.S. patent application Ser. No. 17/977,381, filed Oct. 31, 2022, which is a divisional of U.S. patent application Ser. No. 17/700,058, filed Mar. 21, 2022, now U.S. Pat. No. 11,677,717, which claims the benefit of U.S. Provisional Application No. 63/321,757, filed Mar. 20, 2022, U.S. Provisional Application No. 63/286,520, filed Dec. 6, 2021, and U.S. Provisional Application No. 63/164,492 filed Mar. 22, 2021, which are hereby incorporated by reference.

FIELD

Embodiments of the invention relate to the field of networking; and more specifically, to a secure private traffic exchange in a unified network service.

BACKGROUND

Companies have historically purchased dedicated, private connections between offices and across their data centers. For example, Multiprotocol Label Switching (MPLS) networks can be used to connect private office networks across geographies. These types of connections require complex routing across offices, hardware, and clients. These types of networks also typically require physical devices such as physical firewalls, DDoS appliances, etc., to secure the private networks. For employees to access the general internet, gateway boxes are installed that receive all traffic from the office or data center.

Companies sometimes want to connect their different networks to each other while maintaining control of security, routing, and access policies for what part of their network is accessible to the other network. A conventional way to achieve this includes a physical colocation (e.g., the two networks deploy routers in the same building that are connected with a physical cable), leasing dark fiber/using a metro cross-connect (e.g., routers are not physically co-located but connect over fiber that runs over long distances), or setting up direct point-to-point tunnels over the internet to carry the privately exchanged traffic.

SUMMARY

In an embodiment, the distributed cloud computing network handles traffic between two customers having different network namespaces. Each customer can define policies that define traffic destined for the parts of their network that they wish to expose to the other customer and define security and access policies for the traffic. A cross-customer tunnel (e.g., a GRE tunnel) is deployed on a compute server where one end terminates inside a first customer namespace and the other end terminates inside a second customer namespace. The customers can configure routing policies to determine what traffic in their own namespace gets routed to the other customer's namespace, effectively interconnecting the two networks through a virtual traffic exchange.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
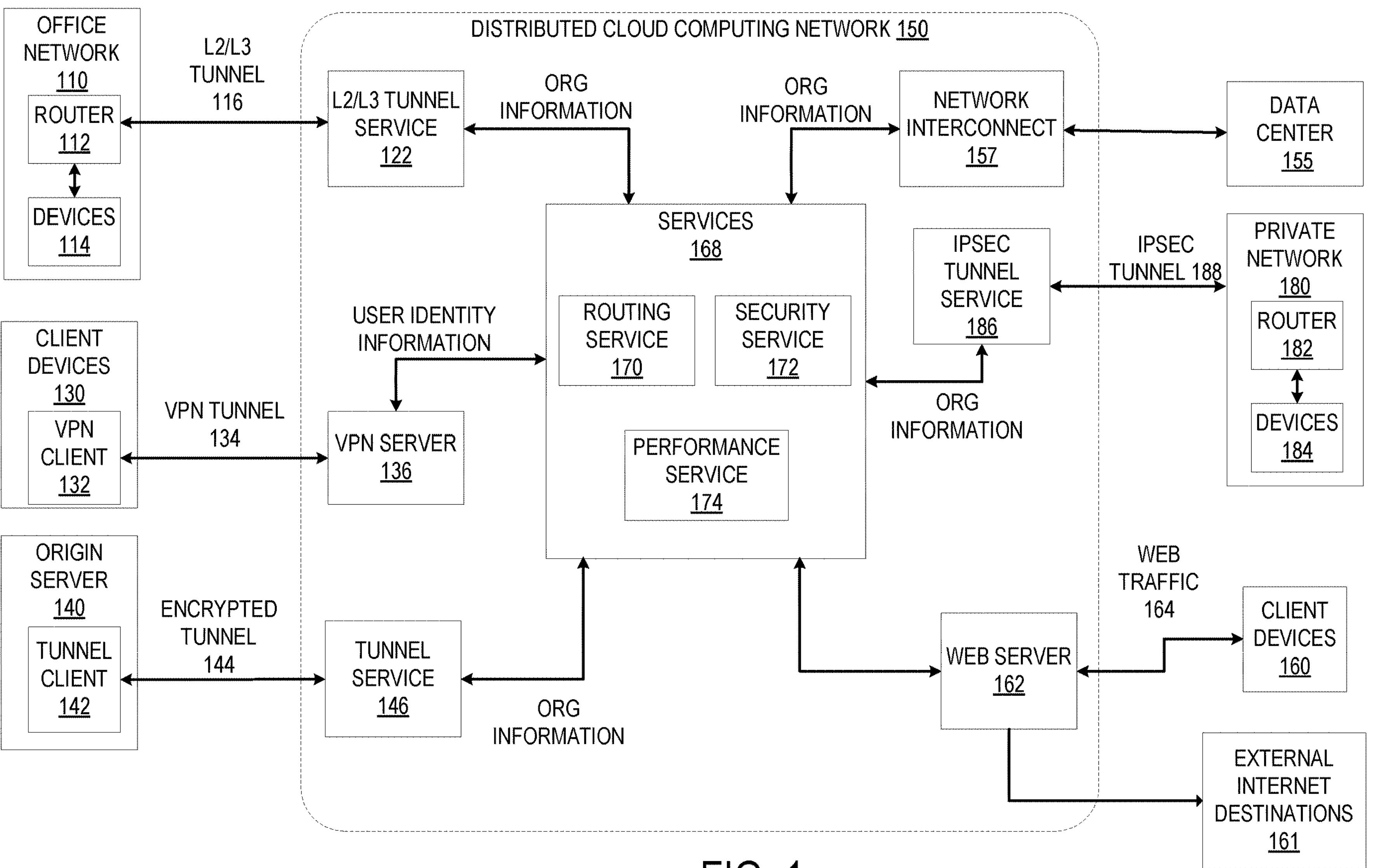
FIG. 1 illustrates an exemplary unified network service that connects multiple disparate private networks of a customer and individual client devices operating on public networks according to an embodiment.

A unified network service that connects multiple disparate private networks and end user client devices operating on separate networks is described. The multiple disparate private networks and end user client devices connect to a distributed cloud computing network that provides routing services, security services, and performance services, and that can be controlled consistently regardless of the connection type. The unified network service provides uniform access control at the L3 layer (e.g., at the IP layer) or at a higher layer using user identity information (e.g., a zero-trust model). The disparate private networks are run on top of the distributed cloud computing network. From the perspective of the customer of the service, the distributed cloud computing network appears to be an independent private network with a standard private address space (e.g., as defined by RFC1918 for IPv4 and RFC4193 for IPv6). The routing layer of the distributed cloud computing network allows customers of the service to have private resources visible only to client devices of the organization (e.g., user devices of the customer and/or server devices of the customer) while using address space that potentially overlaps with other customers of the distributed cloud computing network.

Individual client devices of users of the customer of the distributed cloud computing network may connect to the distributed cloud computing network using an agent on their device that securely connects to the distributed cloud computing network. For instance, the agent may establish a tunnel connection (e.g., a VPN connection) with a server of the distributed cloud computing network and intercept all outgoing internet traffic or a defined subset of traffic and transmit the traffic over the tunnel to the server. The tunnel connection may be a WireGuard point-to-point tunnel or another secure tunnel such as 14, IPsec, or HTTP/2. The agent may connect with the distributed cloud computing network regardless of the internet connection of the client device. For instance, the client device may be on a public Wi-Fi network or other network not owned or controlled by the customer. The agent may be configured to transmit identity information of the user of the client device (e.g., an email address, a unique device identifier, a unique identifier tied to the agent, an organization identifier to which the user belongs, etc.) to the server of the distributed cloud computing network. The distributed cloud computing network maintains user and organization (customer) association for each tunnel connection. When relaying traffic to downstream services for additional processing (e.g., routing services, security services, and/or performance services), the identity information is passed along with the data. The agent on the device may allow for the client device to receive traffic from other devices within the same organization.

Private networks of the customer (e.g., office networks, data center networks, virtual private cloud instances, etc.) may connect to the distributed cloud computing network using stateful tunnel connections (e.g., IPsec, WireGuard, TLS), stateless tunnels such as GRE tunnels, private network interconnects (PNI), or other forms of peering. For example, a piece of network equipment of branch office(s) (e.g., a router) may be configured with a GRE tunnel to the distributed cloud computing network. The single GRE tunnel with the same endpoints may be configured between multiple compute servers of the distributed cloud computing network and the router of the branch office. As another example, a data center may be connected to the distributed cloud computing network with a private network interconnect. The distributed cloud computing network offers full-duplex, bidirectional IP connectivity to the internet with transit provided by the distributed cloud computing network. These connection mechanisms are associated with identity of the organization (the customer). When relaying traffic to downstream services for additional processing (e.g., routing services, security services, and/or performance services), the identity information is passed along with the data. When proxying traffic, the traffic must originate from the same organization in an embodiment.

The distributed cloud computing network may provide one or more additional services to the private networks of the customer. For example, traffic directed to a web property of the customer (e.g., a domain such as www.example.com) may be received at the distributed cloud computing network instead of an origin server of the customer. The traffic may be sent to the distributed cloud computing network because DNS record(s) for the web property resolve to the distributed cloud computing network instead of the origin server. Alternatively, the traffic may be sent to the distributed cloud computing network instead of the origin network because IP address(es) of the origin network are advertised (e.g., using Border Gateway Protocol (BGP)) by the distributed cloud computing network instead of being advertised by the origin network. This causes IP traffic to be received at the distributed cloud computing network instead of being received at the origin network. In either case, a web property may be served by a server on a private origin network and traffic serviced through the distributed cloud computing network.

As another example of a service that may be provided to private networks of the customer, serverless scripts can be implemented at the distributed cloud computing network and can access private services by authenticating with their own identity to the private network. This allows serverless scripts to act as clients to access services on the private network such as database servers or other internal services.

In an embodiment, regardless of how the traffic is received into the unified network service of the distributed cloud computing network, the traffic can be subject to one or more services provided by the distributed cloud computing network including a routing service, a security service, and/or a performance service. The security service may, for example, apply policies to the traffic including layer 3, layer 4, and/or layer 7 policies that may be defined by the customer, perform denial of service detection and mitigation, perform bot detection and mitigation, perform browser isolation, rate limiting, quality of service traffic shaping, intrusion detection and mitigation, data loss prevention, and/or anomaly detection. The performance service may, for example, provide one or more performance features including acting as a content delivery network, image resizing, video streaming, TLS termination, serverless web applications, and/or load balancers. The routing service may include, for example, intelligent routing. Since the traffic may be tagged with identity information (e.g., identity of the organization, identity of the client device, and/or identity of the user), the policies can be enforced based on identity in lieu of or in addition to other network information such as IP addresses.

The distributed cloud computing network maintains a per-customer routing table in an embodiment. This routing table includes information about what service can relay traffic to the private destination address of the customer along with service-specific data (e.g., tunnel ID or address). The destination could be a server on a private network of the customer or an end user client device of the customer, for example. If the unified network service determines that traffic is allowed to proceed to its destination, the virtual routing table for the customer is accessed to determine the selected service for delivery to the destination and the connection or packet is sent to that destination.

In an embodiment, traffic can be sent from any one of the connections of the customer to the distributed cloud computing network to another one of the connections of the customer regardless of the different technologies connecting networks and/or devices of the customer to the distributed cloud computing network. For instance, a TCP connection that arrives via an agent on an end user client device, or a TCP connection that arrives on a GRE tunnel, can be sent to a layer 7 based tunnel. Vice versa, a TCP connection that arrives on a layer 7 based tunnel may be sent to a tunnel connecting to an end user client device. In case of a stateless service, such as a GRE tunnel, the data may be unwrapped and delivered over the stateless tunnel. In case of a stateful tunnel, the underlying service may relay the connection or packets to the server where the client or tunnel is connected before delivering the connection or packets to the device or service.

Figure 2:
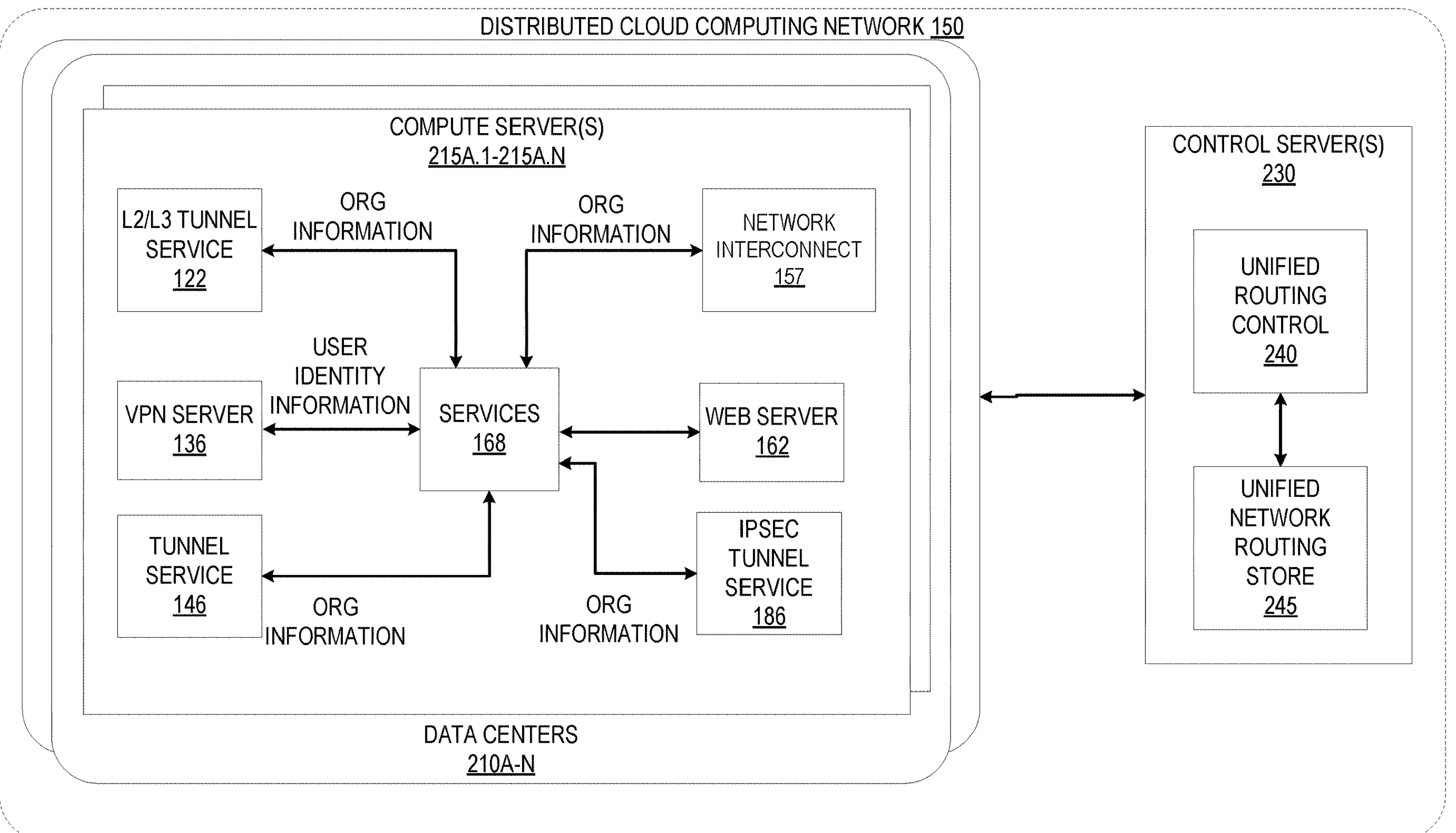
FIG. 2 shows an embodiment where the distributed cloud computing network includes the data centers that include one or more compute servers according to an embodiment.

FIG. 1 illustrates an exemplary unified network service that connects multiple disparate private networks of a customer and individual client devices operating on public networks according to an embodiment. The unified network service is provided by the distributed cloud computing network 150. The distributed cloud computing network 150 may include multiple data centers (not illustrated in FIG. 1). For instance, FIG. 2 shows an embodiment where the distributed cloud computing network 150 includes the data centers 210A-N that include one or more compute servers 215A.1-215A.N-215N.1-215N.N respectively. There may be hundreds to thousands of data centers, for example. The data centers 210A-N are geographically distributed (e.g., throughout the world). Each data center may also include one or more control servers, one or more DNS servers, and/or one or more other pieces of network equipment such as router(s), switch(es), and/or hub(s). In an embodiment, each compute server within a data center may process internet traffic (e.g., TCP, UDP, HTTP/S, SPDY, FTP, TCP, UDP, IPSec, SIP, or other IP protocol traffic). For example, each compute server 215 can perform the functions as described with respect to FIG. 1 in an embodiment. The data centers 210A-N may be connected across the public internet.

Multiple disparate private networks of multiple customers may connect to the distributed cloud computing network 150, and multiple end user client devices of multiple customers may connect to the distributed cloud computing network 150. The distributed cloud computing network 150 includes multiple traffic interfaces for different types of traffic and/or connections, including the L2/L3 tunnel service 122, the VPN server 136, the tunnel service 146, the network interconnect 157, the web server 162, and the IPSec tunnel service 186. The L2/L3 tunnel service 122 is a traffic interface that may receive/transmit traffic over a L2/L3 tunnel such as a GRE tunnel. The L2/L3 tunnel service 122 may be a stateless traffic interface. The VPN server 136 is a traffic interface that may receive/transmit traffic over a VPN tunnel. The VPN server may be a stateful traffic interface. The tunnel service 146 is a traffic interface that may receive/transmit traffic over an encrypted tunnel. The tunnel service 146 may be a stateful traffic interface and operate at layer 7. The network interconnect 157 is a traffic interface that receives/transmits traffic over a network interconnect such as a private network interconnect. The web server 162 is a traffic interface that receives/transmits web traffic. The web server 162 may be a stateless or stateful interface depending on the type of traffic being received/transmitted. The IPSec tunnel service 186 is a traffic interface that receives/transmits traffic over an IPSec tunnel.

The office network 110 is a private network of a customer that may be at a branch office. The office network 110 includes the devices 114 that are connected to the router 112 or another piece of network equipment. The devices 114 may include server devices, client devices, workstations, laptops, smartphones, printers, copiers, etc., that are connected on the private office network 110. These devices 114 have an external network connection through the router 112 or another piece of network equipment. A layer 2 or layer 3 tunnel 116 may connect the office network 110 (through the router 112) with a layer 2 or layer 3 (L2/L3) tunnel service 122 of the distributed cloud computing network 150. For instance, a GRE tunnel may be configured between the router 112 and the L2/L3 tunnel service 122. Traffic from/to the office network (e.g., all traffic from the office network) is then transmitted over the tunnel connection with the distributed cloud computing network 150.

In an example, a single GRE tunnel with the same endpoints is configured between each of the compute server(s) 215A-215N of the data centers 210A-N (terminating at the L2/L3 tunnel service 122) and the router 112 of the office network 110. If the customer has multiple offices, the customer may configure a GRE tunnel at each of the multiple offices using the same endpoint of the distributed cloud computing network 150. The GRE endpoints at the compute server(s) 215A-215N may use the same anycast IP address to terminate the GRE tunnel. A router in each of the data centers 210A-N may advertise the same anycast IP address and the compute server(s) 215A-N are configured to accept traffic directed to that same anycast IP address and advertise that same anycast IP address to the router. The GRE endpoint at the router 112 is generally a publicly routable IP address for the office network 110. Since the GRE endpoints at the compute server(s) 215A-N of the data centers 210A-N use the same anycast IP address to terminate the GRE tunnel, each of the compute server(s) 215A-N of the data centers 210A-N are able to receive traffic over the GRE tunnel from the office network 110. A single GRE tunnel configuration on the side of the office network 110 effectively establishes a GRE tunnel with each of the compute server(s) 215A-N, which eliminates the requirement to configure multiple GRE tunnels with different data centers 210A-N. Thus, a single GRE tunnel is effectively shared between each of the compute server(s) 215A-N and the office network 110. Any of the compute server(s) 215A-N can be removed from production or fail, and a different one of the compute server(s) 215A-N is still able to receive the GRE traffic from the office network 110. Also, any of the data centers 210A-N can be removed from production or fail, and the next closest data center to the office network 110 will start receiving the GRE traffic from the office network 110. Thus, no single compute server or single data center 210A-N is a single point of failure. Although an embodiment has been described where GRE tunnels are configured between the compute server(s) 215A-N and the office network 110 (e.g., the router 112), in an alternative embodiment, GRE tunnels are configured between a router of each data center 210A-N and the office network 110 (e.g., the router 112). However, performing the GRE encapsulation/decapsulation on the compute server(s) 215A-N instead of routers of the data centers 210A-N reduces the compute overhead on the routers and may provide better scaling.

As another example with respect to IPSec, the private network 180 of a customer may be at a branch office and includes the devices 184 that are connected to the router 182 or another piece of equipment. The devices 184 may include server devices, client devices, workstations, laptops, smartphones, printers, copiers, etc., that are connected on the private network 180. These devices 184 have an external network connection through the router 182 or another piece of network equipment. An IPSec tunnel 188 connects the private network 180 (through the router 182) with the IPSec tunnel service 186 of the distributed cloud computing network 150. Traffic from/to the private network 180 (e.g., all traffic from the private network network) is then transmitted over the IPSec tunnel connection with the distributed cloud computing network 150.

In an embodiment, the IPSec tunnel is configured with an anycast IP address of the distributed cloud computing network 150. For instance, a router in each of the data centers 210A-N may advertise the same anycast IP address and the compute server(s) 215A-N are configured to accept traffic directed to that same anycast IP address and advertise that same anycast IP address to the router. Since the IPSec tunnel endpoints at the compute server(s) 215A-N of the data centers 210A-N use the same anycast IP address, each of the compute server(s) 215A-N of the data centers 210A-N are able to receive traffic directed to that IP address.

As an example, the router 182 of the private network 180 opens an IPSec tunnel to an anycast IP address of the distributed cloud computing network 150. The router 182 connects to a compute server of the data centers 210A-N that is closest to the router 182 via an anycast protocol implementation. In an embodiment, each compute server is able to perform a handshake (e.g., a key-agreement protocol such as Internet Key Exchange) with the router 182. For instance, key-agreement protocol configuration (e.g., customer identifier, preshared key, etc.) may be propagated to each compute server. The compute server that receives the request performs the handshake with the router 182 including generating security associations for encrypting and decrypting traffic. The security associations include the security parameters for the IPsec tunnel (e.g., parameters for authentication and encryption). Security associations are installed to the kernel of the compute server for intercepting packets and encrypting or decrypting as necessary. An IP packet that is destined for the router 182 (or received from the router 182) can be received at any of the compute servers of the data centers 210A-N due to the anycast IP address. That IP packet must be encrypted according to the generated security association and sent to the customer router 182 for decryption and processing. Similarly, an encrypted IP packet received from the customer router 182 over the IPSec tunnel must be decrypted using the generated security association.

In an embodiment, the stateful information that allows encryption and decryption of the IPsec traffic is propagated to each compute server of the data centers 210A-N. For example, data about the IPSec tunnel 188 (e.g., the IP address of the IPSec tunnel service 186 that performs the handshake and the IPSec security associations) are stored in a database that is available to each compute server. This data may be pushed to each of the data centers 210A-N and/or each compute server of each data center 210A-N (and installed to the kernels of those compute servers), or the data may be queried by a compute server that receives an IP packet that needs to be encrypted or decrypted with the security associations. For example, the IPSec data may be stored in the unified network routing store as will be described in greater detail later herein. This stateful information may be handed to the routing service 170 that then causes the data to be stored in the unified network routing store.

Thus, a customer can establish a single IPSec tunnel to the distributed cloud computing network 150 (which initially is terminated at a single compute server) and any of the compute servers of the data centers 210A-N can receive and process the IPsec data (e.g., encrypt/decrypt). Thus, a single IPsec tunnel configuration on the side of the private network 180, for example, effectively establishes an IPsec tunnel with each of the compute servers of the distributed cloud computing network 150. Each compute server is able to handle these IPsec packets regardless of any one failure point. Any of the compute server(s) 215A-N can be removed from production or fail, and a different one of the compute server(s) 215A-N is still able to receive and process the IPsec traffic from the private network 180. Also, any of the data centers 210A-N can be removed from production or fail, and the next closest data center to the private network 180 will start receiving the IPsec traffic from the private network 180. Thus, no single compute server or single data center 210A-N is a single point of failure.

While an embodiment has been described with respect to an IPSec tunnel connecting a private network 180 to the distributed cloud computing network 150, the encrypted tunnel 144 may be an IPSec tunnel and/or the L2/L3 tunnel 116 may be an IPSec tunnel.

Referring back to FIG. 1, another private network may include a private application or service running on an origin network of the customer. For instance, the origin server 140 may have content (e.g., an application, service, etc.) that the customer wants to secure without the content being exposed to the general internet. The content may be running locally on the origin server 140 or behind a firewall/NAT. To connect this private network to the distributed cloud computing network 150, the tunnel client 142 connects to the tunnel service 146 and requests a tunnel be established between the origin server 140 and the distributed cloud computing network 150. In an embodiment, the tunnel client 142 connects to a compute server that is closest to the origin server 140 via an anycast protocol implementation. In another embodiment, the tunnel client 142 connects to a compute server via a site-local address (a private address that is not globally routable) for the compute server. The connection to the tunnel service 146 is over an encrypted tunnel 144. The connection may be secured with a pinned certificate embedded in the tunnel client 142. The tunnel client 142 may be configured to send configuration information for the tunnel to the tunnel service 146. The configuration information may include authentication information (e.g., username/pas sword, an access token (e.g., an API key), cryptographic identity (e.g., a certificate), and/or email address), TLS configuration information (e.g., type of TLS supported), port, and/or hostname that traffic should be received on. The tunnel client 142 may collect data during operation and report the collected data to the tunnel service 146 that can be used as additional metrics for load balancing. The encrypted tunnel 144 may be a layer 7 based tunnel.

A virtual origin may be created within the distributed cloud computing network 150 when the encrypted tunnel 144 is established. The virtual origin may have its own configuration, access rules, authentication policies, etc. For instance, the tunneled hostname owner can establish policies (e.g., allowing X number of connections per second, specifying certain routes, specifying incoming traffic from only certain IP addresses and/or IP address ranges, etc.) that are enforced at the compute servers of the distributed cloud computing network 150. The virtual origin hides the origin of the IP address of the tunneled hostname. Thus, the tunneled content does not have a public IP address and thus cannot be directly attacked. To say it another way, attacks directed to the tunneled hostname will not be received at the origin server 140, and the IP address of the origin server 140 is not otherwise exposed. After establishing the encrypted tunnel 144, data can be transmitted over that tunnel. For instance, a compute server may receive an HTTP request for the tunneled hostname, identify the intended origin server 140, and transmit the HTTP request towards, or over, the established tunnel.

As another example, a data center 155 of the customer may be connected to the distributed cloud computing network 150 with a private network interconnect 157. Traffic is then directly transmitted between the network interconnect 157 and the data center 155. Although a PNI is described, the datacenter could also be connected over an Internet Exchange or other peering.

As another example of traffic being received at the distributed cloud computing network, the end user client devices 130 may connect to the distributed cloud computing network using an agent on their device that transmits the internet traffic to the distributed cloud computing network. For instance, the client devices 130 may include the VPN client 132 that may establish a tunnel connection (e.g., a VPN connection) with a VPN server 136 running on a compute server of the distributed cloud computing network 150. The VPN client 132 may intercept all outgoing internet traffic or a defined subset of traffic and transmit the traffic over the VPN tunnel 134 to the server. The tunnel connection may be a WireGuard point-to-point tunnel or another secure tunnel such as TLS, IPsec, or HTTP/2. The agent may connect with the distributed cloud computing network regardless of the internet connection of the client device. The end user client devices 130 may belong to the customer (e.g., work devices that remote users are using) and/or devices of individuals that are affiliated with the customer. In either case, the agent installed on the end user client devices 130 identifies the traffic as being attributed to the customer. The destination of the traffic does not need to be that of the customer. For instance, the destination of the traffic may be an external internet destination 161, for example. The end user client devices 130 may have an internet connection through a public Wi-Fi network, a private Wi-Fi network, a cellular network (e.g., 4G, 5G, etc.), or another network not owned or controlled by the customer. The VPN client 132 is configured to transmit identity information of the user of the client device (e.g., an email address, a unique device identifier, a unique identifier tied to the agent, and an organization identifier to which the user belongs) to the VPN server 136 executing on a compute server of the distributed cloud computing network 150. The VPN client 132 may be assigned a private IP address (e.g., an IPv4 and/or IPv6), which may come from a subnet chosen by the customers.

Although FIG. 1 illustrates the client devices 130 that include the VPN client 132 as being not part of the office network 110, it is possible that a client device may include a similar VPN client as part of the devices 114. For instance, an employee may work part time remotely and have the VPN client installed on their client device, and that VPN client may still be installed and configured when the employee goes into the office and is on the office network 110. In an embodiment, if the VPN client detects that it is on an office network, the VPN client may not establish a VPN tunnel with the VPN server 136 but instead may use the office network 110. In such an embodiment, the VPN client may still associate the traffic with the client device and/or user.

As another example of traffic being received at the distributed cloud computing network 150, traffic directed to a web property of the customer (e.g., a domain such as www.example.com) may be received at the distributed cloud computing network instead of an origin server of the customer (e.g., origin server 140). For instance, the client devices 160, which do not have an agent that causes web traffic 164 to be sent to the distributed cloud computing network 150, may transmit internet traffic for a resource of the customer where that traffic is received at the distributed cloud computing network 150 instead of the origin. A compute server may receive network traffic from the client devices 160 requesting network resources. For example, the web server 162 executing on a compute server may receive requests for an action to be performed on an identified resource (e.g., an HTTP GET request, an HTTP POST request, other HTTP request methods, or other requests to be applied to an identified resource on an origin server) from a client device. The request received from the client device may be destined for an origin server (e.g., origin server 140 or other origin server of the customer). The web server 162 may receive the requests from client devices 160 in several ways. In one embodiment, the request is received at the web server 162 because the domain of the requested web page resolves to an IP address of the distributed cloud computing network 150 instead of the origin server. For example, if the customer has the domain example.com, a DNS request for example.com returns an IP address of a compute server of the distributed cloud computing network 150 instead of an IP address of the origin server handling that domain. Alternatively, the traffic may be sent to the distributed cloud computing network 150 instead of the origin network because IP address(es) of the origin network are advertised (e.g., using Border Gateway Protocol (BGP)) by the distributed cloud computing network 150 instead of being advertised by the origin network. This causes IP traffic to be received at the web server 162 instead of being received at the origin network. In either case, a web property may be served by a server on a private origin network and traffic serviced through the distributed cloud computing network 150.

As another example of a service that may be provided to private networks of the customer, serverless scripts can be implemented at the distributed cloud computing network 150 and can access private services by authenticating with their own identity to the private network. This allows serverless scripts to act as clients to access services on the private network such as database servers or other internal services.

In an embodiment, regardless of how the traffic is received into the unified network service of the distributed cloud computing network 150, the traffic can be subject to one or more services 168 provided by the distributed cloud computing network 150 including a routing service 170, a security service 172, and/or a performance service 174. The security service 172 may, for example, apply policies to the traffic including layer 3, layer 4, and/or layer 7 policies that may be defined by the customer, perform denial of service detection and mitigation, perform bot detection and mitigation, perform browser isolation, intrusion detection and mitigation, data loss prevention, and/or anomaly detection. The performance service 174 may, for example, provide one or more performance features including acting as a content delivery network, image resizing, video streaming, TLS termination, serverless web applications, rate limiting, quality of service traffic shaping, and/or load balancers. The routing service 170 may include, for example, intelligent routing, and/or otherwise determine the outgoing traffic interface for the traffic. Since the traffic may be tagged with identity information (e.g., identity of the organization, identity of the client device, and/or identity of the user), the policies can be enforced based on identity in lieu of or in addition to other network information such as IP addresses.

In an embodiment, traffic may be received from devices on private networks of the customer and/or individual end user client devices, processed at the distributed cloud computing network 150 using a unified policy set that based on identity, device posture, and/or risk signals, and transmitted to destinations that may be on different private networks or individual end user client devices. For instance, the policies may be created by the customer and apply to layer 3, layer 4, and/or layer 7, and the polices can include identity, device posture, and/or risk signals. Also, the distributed cloud computing network can control routing between the resources of the customer, provide quality of service configuration, and accelerate transit.

For example, a customer may have a secure resource available in their private network at IP address 10.1.2.3 (e.g., the secure resource available through the origin server 140 and exposed over the encrypted tunnel 144), and may specify that only traffic from devices within the customer's private network (e.g., traffic from devices 114 of the office network 110) or from devices attributable to the customer (e.g., traffic from client devices 130 that have an agent installed that is associated with the customer) may access that secure resource. Traffic received at the distributed cloud computing network 150 that is addressed to the IP address 10.1.2.3 will be subject to the identity policy. If the traffic received is not from a device in the customer's private network and/or not from a client device that has an agent associated with the customer, the traffic will be dropped. As another example, the customer may specify particular user(s) and/or group(s) of user(s) that are allowed to access the resource at the IP address 10.1.2.3. In such a case, the security service 172 will only allow traffic to reach the resource at the IP address 10.1.2.3 if that traffic is received from that particular user(s) and/or group(s) of user(s).

The distributed cloud computing network 150 can also apply network traffic monitoring, alerting, and/or analysis features. For instance, the security service 172 may provide for an intrusion detection system (IDS). The IDS can notify a customer when traffic is observed that matches predefined criteria, such as IP addresses within known sets of high-risk IP addresses. Such criteria can be specified by the customer and/or be dynamically updated based on historical analysis and/or third-party threat intelligence feeds. Alternatively, or additionally, the IDS may provide events to policies to block traffic matching the IDS criteria (sometimes known as Intrusion Prevention System). As another example, the security service 172 may provide a data loss prevention (DLP) service. The DLP service may perform deep packet inspection and/or application payload inspection for monitoring traffic leaving the customer's network, scanning for sensitive information, and/or alerting or blocking on violations of access to such sensitive information. As another example, the security service 172 may provide an anomaly detection service. The anomaly detection service may notify a customer when traffic patterns deviate from normal traffic patterns, which can be learned by monitoring traffic for a learning period and then determining traffic that falls outside of normal bounds learned during the learning period.

With reference back to FIG. 2, in an embodiment, the compute servers 215A.1-215A.N of the data centers 210A-N are coupled with one or more control servers 230. The control server(s) 230 may provide configuration and other information to these compute servers. As shown in FIG. 2, the control server(s) 230 include a unified routing control 240 and a unified network routing store 245. The unified routing control 240 tracks and provisions unified routing information for the unified network that is stored in the unified network routing store 245. The unified network routing store 245, or at least a portion thereof, may be propagated to the compute servers 215A.1-215A-N of the data centers 210A-N. The unified network routing store 245 is the single source of truth of routing information for a customer's network, which ensures that the private network of the customer is consistent. For example, if the customer has an IPSec tunnel, the unified routing control 240 may ensure that the CIDR block(s) for the IPSec tunnel do not overlap with other private parts of the network such as other tunnels.

The unified network routing store 245 may include data regarding interfaces (e.g., tunnels), routes, and connections. For instance, the store may map IP addresses (which may be virtual addresses) to tunnels and map tunnels to physical connections. The tunnel information includes information about tunnels configured between private networks and the distributed cloud computing network. The tunnel information may include, for each tunnel, a unique tunnel identifier, a customer identifier that identifies the customer to which that tunnel belongs, a type of tunnel (e.g., IPsec tunnel, GRE tunnel, VPN tunnel, origin tunnel, or other tunnel type), and other metadata specific to that tunnel (e.g., a customer router IP address for an IPsec tunnel, a device private virtual IP address for a VPN tunnel, a customer router IP address for a GRE tunnel). The route information may include, for each route, a customer identifier, a tunnel identifier, a network CIDR block to which the tunnel can route, and priority information. The connection information includes information about the interfaces and may include, for each interface, an interface identifier, a customer identifier, a tunnel identifier, a connection index, a client identifier (e.g., a device or process identifier for a VPN tunnel), an origin IP address (e.g., a public IP address of the origin for an origin tunnel, a customer router's network interface public IP address for an IPsec tunnel, a customer router's network interface public IP address for a GRE tunnel, a public IP address of a device for a VPN tunnel), a compute server IP address (e.g., an IP address of the compute server that maintains the origin tunnel, an IP address of the compute server that exchanged the security associations, an IP address of the compute server maintaining the VPN tunnel), and other metadata such as the security associations for an IPsec tunnel.

In an embodiment, the routing service 170 provides an interface that allows services of the distributed cloud computing network 150 to determine where traffic should be routed and how the traffic should be routed. For example, the L2/L3 tunnel service 122, the VPN server 136, the tunnel service 146, the network interconnect 157 the IPSec tunnel service 186, the security service 172, and/or the performance service 174 may use the routing service 170 to determine where incoming traffic should be routed and how the traffic should be routed. As an example, an ingress interface (e.g., L2/L3 tunnel service 122, VPN server 136, tunnel service 146, network interconnect 157, IPSec tunnel service 186) may receive a packet from a private portion of a customer's network with a target destination IP address and query the routing service 170 to determine if the target destination IP address is in the customer's network and if so how to reach it. The routing service 170 accesses the unified network routing store 245 (or a version of the unified network routing store 245 that is propagated to the compute server that is executing the routing service 170) to determine if there is a matching route and if so, respond to the ingress interface with the necessary data to route the packet (e.g., tunnel ID, type of tunnel, IP address of a compute server that can handle transmitting the packet (which may be "any" compute server or an IP address that is assigned to a specific compute server), and other metadata specific to the type of the tunnel. The ingress interface may then use that information to transmit the packet to the egress interface.

In another embodiment, the ingress interface of the distributed cloud computing network 150 transmit the traffic to the services 168 for determining the egress interface, whether the packet is permitted to be forwarded to the egress interface and/or target destination, and how the traffic should be routed to get to the egress interface. Using a similar example as above, an ingress interface (e.g., L2/L3 tunnel service 122, VPN server 136, tunnel service 146, network interconnect 157, web server 162, IPSec tunnel service 186) receives a packet from a private portion of a customer a customer's network with a target destination IP address. The ingress interface forwards the packet to the services 168 and may include identity information attributable for the packet. The security service 172 may, for example, apply policies to the traffic including layer 3, layer 4, and/or layer 7 policies that may be defined by the customer, perform denial of service detection and mitigation, perform bot detection and mitigation, perform browser isolation, intrusion detection and mitigation, data loss prevention, and/or anomaly detection, potentially with identity information. If the packet is permitted to be forwarded, the routing service 170 may then determine how to route the packet to transmit the packet to the target destination, and may cause the packet to be transmitted over that egress.

The unified network routing store 312 stores persistent routing data and volatile routing data. Persistent routing data does not often change; whereas volatile routing data changes more frequently (e.g., minutes, hours). For instance, for tunnels, persistent data includes tunnel information and routes to tunnels; and volatile data includes data regarding a tunnel connection from an origin server to a compute server of the distributed cloud computing network. For an IPSec traffic interface, persistent data includes data about an IPSec tunnel (e.g., customer identifier, IP address of the IPSec interface of the distributed cloud computing network 150 performing the IKE handshake) and an IPSec route (e.g., customer identifier, IP address of the IPSec interface on the customer's router, the network/CIDR that the IPSec interface advertises); and volatile data includes data regarding IPSec security associations (e.g., customer identifier, the IP address of the IPSec interface on the customer's router, the Security Parameter Index (SPI), type, key material for encrypting or decrypting, etc.). For VPN server interface, persistent data includes data about a tunnel client (e.g., customer identifier, device identifier) and data about the IP address(es) assigned to the device (e.g., customer identifier, device identifier, the private IP address assigned to the device), and volatile data includes data about VPN connections (e.g., customer identifier, device identifier, IP address of the compute server of the distributed cloud computing network 150 that terminates the VPN connection). For a L2/L3 tunnel (e.g., a GRE tunnel), persistent data includes data about an L2/L3 tunnel (e.g., customer identifier, tunnel routing address) and an L2/L3 tunnel route (e.g., customer identifier, tunnel routing address, and network/CIDR that the router advertises).

Figure 3:
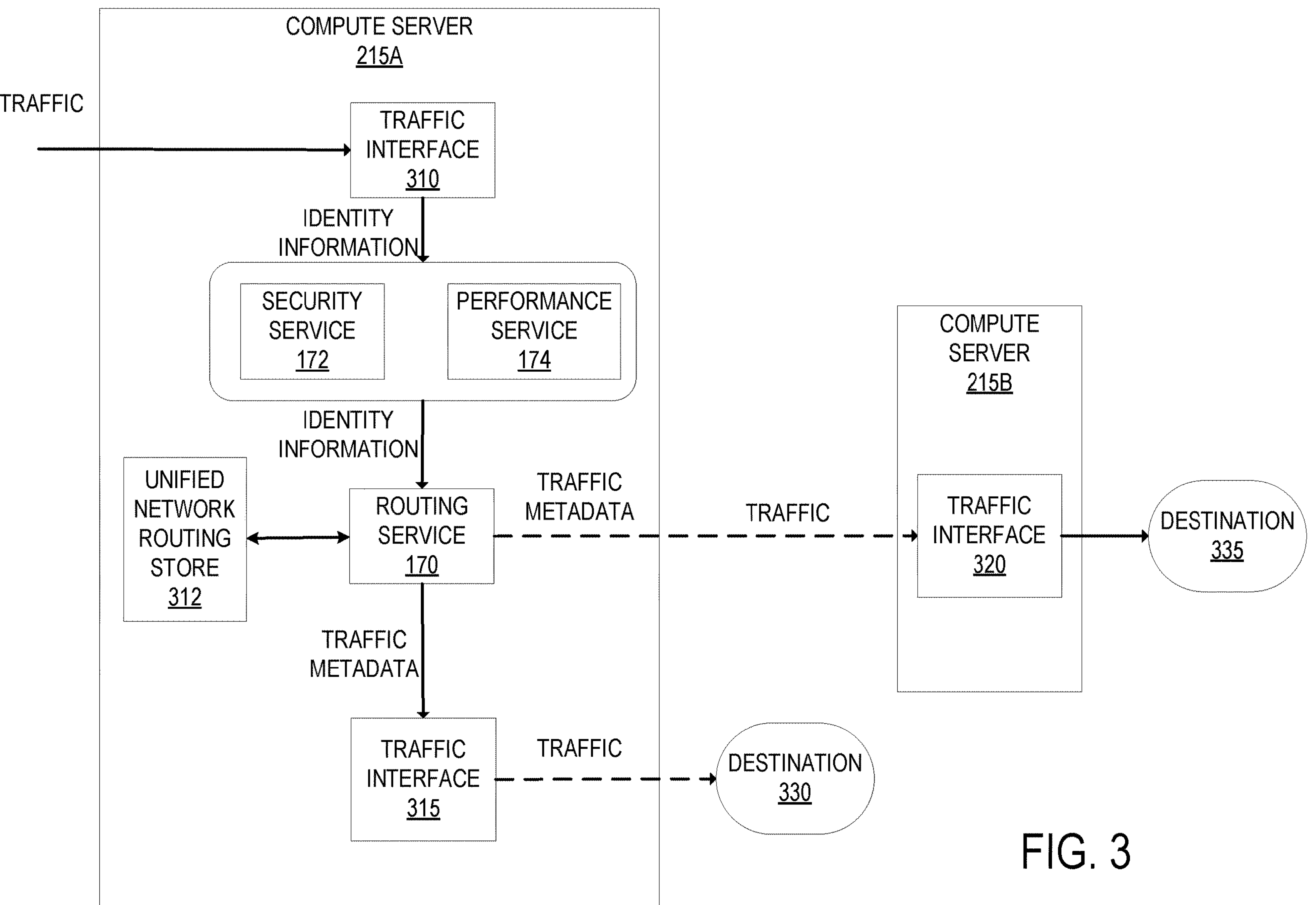
FIG. 3 illustrates an example of processing traffic received at a first traffic interface that is destined to a network that interfaces with a second traffic interface according to an embodiment.

FIG. 3 illustrates an example of processing traffic received at a first traffic interface that is destined to a network that interfaces with a second traffic interface. The first traffic interface 310 may be any type of traffic interface for receiving/transmitting traffic from private and/or public networks, including the L2/L3 tunnel service 122, the VPN server 136, the tunnel service 146, the network interconnect 157, the web server 162, and/or the IPSec tunnel service 186. The ingress traffic may be attributable to a customer of the unified network service. For example, the source of the ingress traffic may be from a customer network and/or from a device associated with the customer such as a VPN client. As another example, the ingress traffic may be destined for a resource or web property of the customer. The ingress traffic may be associated with identity of the organization, identity of the client device that transmitted the traffic, and/or identity of the user responsible for transmitting the traffic. The identity may be determined based on the interface in which the ingress traffic was received. For instance, if the ingress traffic is received at a GRE traffic interface that is connected with a GRE tunnel to a customer network, the customer may be identified through the association of a customer identifier and the tunnel identifier. As another example, if the ingress traffic is received at a VPN server traffic interface that terminates VPN connections from client devices with VPN clients, the VPN client may transmit identity information of the user of the client device (e.g., an email address, a unique device identifier, a unique identifier tied to the agent, and an organization identifier to which the user belongs). As another example, the customer may configure identity properties to traffic interfaces (e.g., the GRE tunnel with identifier of 1 is connected to the San Jose office; the GRE tunnel with identifier of 2 is connected to the New York office). The customer may configure organizational mappings to users/devices (e.g., user Dave is in the marketing department, etc.).

The traffic interface 310 passes the identity information associated with the traffic to the security service 172 and/or the performance service 174. In some embodiments, the traffic is tagged with the identity information. The performance service 174, which is optional in some embodiments, performs one or more performance services on the traffic as previously described using the identity information. The security service 172, which is optional in some embodiments, performs one or more security services. For example, the security service 172 can apply one or more policies to the received traffic to determine whether access is allowed to the target destination. The policies may be created by the customer and apply to layer 3, layer 4, layer 7 (for example) and can be based on identity, device posture, location, and/or risk signals.

If the security service 172 determines that the traffic is not allowed to the destination, the traffic is typically dropped. If the traffic is allowed to the destination, the security service 172 forwards the traffic to the routing service 170. The routing service 170 determines the outgoing traffic interface for the traffic, which may be on a different compute server. The incoming traffic interface and the outgoing traffic interface may be implementing different technologies connecting networks and/or devices. For instance, a TCP connection that arrives via an agent on an end user device or a TCP connection that arrives on a GRE tunnel can be sent to a layer 7 based tunnel. Vice versa, a TCP connection that arrives on a layer 7 based tunnel may be sent to a tunnel connecting to an end user client device.

As shown in FIG. 3, the compute server 215A includes the unified network routing store 312. The unified network routing store 312 may be a local copy of the unified network routing store 245 or may be a proper subset of the unified network routing store 245. Like the unified network routing store 245, the unified network routing store 312 stores persistent routing data and volatile routing data. The routing service 170 accesses the unified network routing store 312. As described above, the routing information includes data about routes. Generally, each route includes a customer identifier (used to separate private networks of multiple customers), a set of one or more IP addresses of the service or resource (which may be private address(es)), and an identifier of the traffic interface that can handle outgoing traffic to the targeted destination (e.g., a tunnel identifier). A single route can provide a route to many destination IP addresses. The granularity of a route, e.g., the size of its IP range, is based on the topology of the network of the customer. In some embodiments, a single route cannot span unconnected parts of the network, such as two separate offices.

It is possible that the compute server that receives the incoming traffic is not able to forward the outgoing traffic to the destination. For instance, if the identified traffic interface is for a traffic interface with a stateful connection (e.g., an encrypted tunnel) and the current compute server does not have the requisite state (e.g., the encrypted tunnel is not established between the current compute server and the target destination), the routing service 170 forwards the traffic to a compute server that is capable of sending that traffic outbound over the traffic interface. The route may indicate a set of one or more compute servers that have the traffic interface that can handle outgoing traffic to the targeted destination. In the example of FIG. 3, the routing service 170 forwards traffic to the traffic interface 320 on the compute server 215B. The traffic metadata (e.g., the customer identifier, the traffic interface identifier, the set of one or more IP addresses, and the source/destination of the origin traffic) is also forwarded to the traffic interface 320, which then forwards the traffic to the destination 335.

It is also possible that the compute server that receives the incoming traffic is capable of forwarding the outgoing traffic to the destination. For instance, if the outgoing traffic interface is a GRE tunnel (which is stateless), the current compute server can forward the traffic over the GRE interface to the destination. In such a case, the routing service 170 forwards the traffic to the outbound traffic interface 315 running on the current compute server 215A. The traffic metadata (e.g., the customer identifier, the traffic interface identifier, the set of one or more IP addresses, and the source/destination of the origin traffic) is also forwarded to the traffic interface 315, which then forwards the traffic to the destination 330.

For example, consider traffic being received from a VPN client 132 at the VPN server 136 that is destined to an application running behind the tunnel client 142 over the encrypted tunnel 144. If a security service and/or a performance service is configured to be performed, the VPN server 136 may transmit the traffic to the security service 172 and/or performance service 174. After the traffic is processed by these service(s), the traffic is forwarded to the routing service 170 for processing. If a security service and/or a performance service is not configured to be performed, the VPN server 136 may transmit the traffic to the routing service 170. In either case, the routing service 170 receives the traffic and that traffic may be associated with identity information provided by the VPN client 132 (e.g., customer identifier, user identifier, and/or device identifier). The routing service 170 determines the destination of the traffic. If the destination IP address is associated with a destination of the unified network, the routing service 170 transmits the traffic to a traffic interface that can handle the outgoing traffic. For instance, if the routing service 170 determines that the destination is associated with an encrypted tunnel 144, the routing service 170 determines an identifier of the tunnel, a type of tunnel, and the compute server to which the tunnel is connected (e.g., an IP address of the compute server that is a tunnel endpoint for the tunnel), and may transmit the traffic over that tunnel to the destination.

The routing service 170 may be executed on each compute server of the distributed cloud computing network 150. Each compute server 215 of a data center 210 may have a local copy of the unified network routing store 312. Alternatively, the unified network routing store 312 may be shared among compute servers 215 of a single data center 210. In either case, the unified network routing store 312 may be centrally managed with updates (e.g., additions, modifications, deletions) being transmitted from the central location such as the unified network routing store 245. In an embodiment, the routing service 170 uses the local version of the unified network routing store 312 when determining where and how to route traffic. However, if the information is wrong or stale, the routing service 170 may request an update from the central location of the data (e.g., the unified network routing store 245). For example, if the routing service 170 on a first compute server determines that traffic destined for a VPN connection is terminated at a second compute server, it will transmit that traffic to that second compute server. If the second compute server does not terminate that VPN connection for that traffic (e.g., the routing information is wrong or stale), the second compute server may respond to the routing service 170 and/or the first compute server that indicates the information was wrong. The routing service 170 then requests an update from the central location of the data to determine the correct destination.

Figure 4:
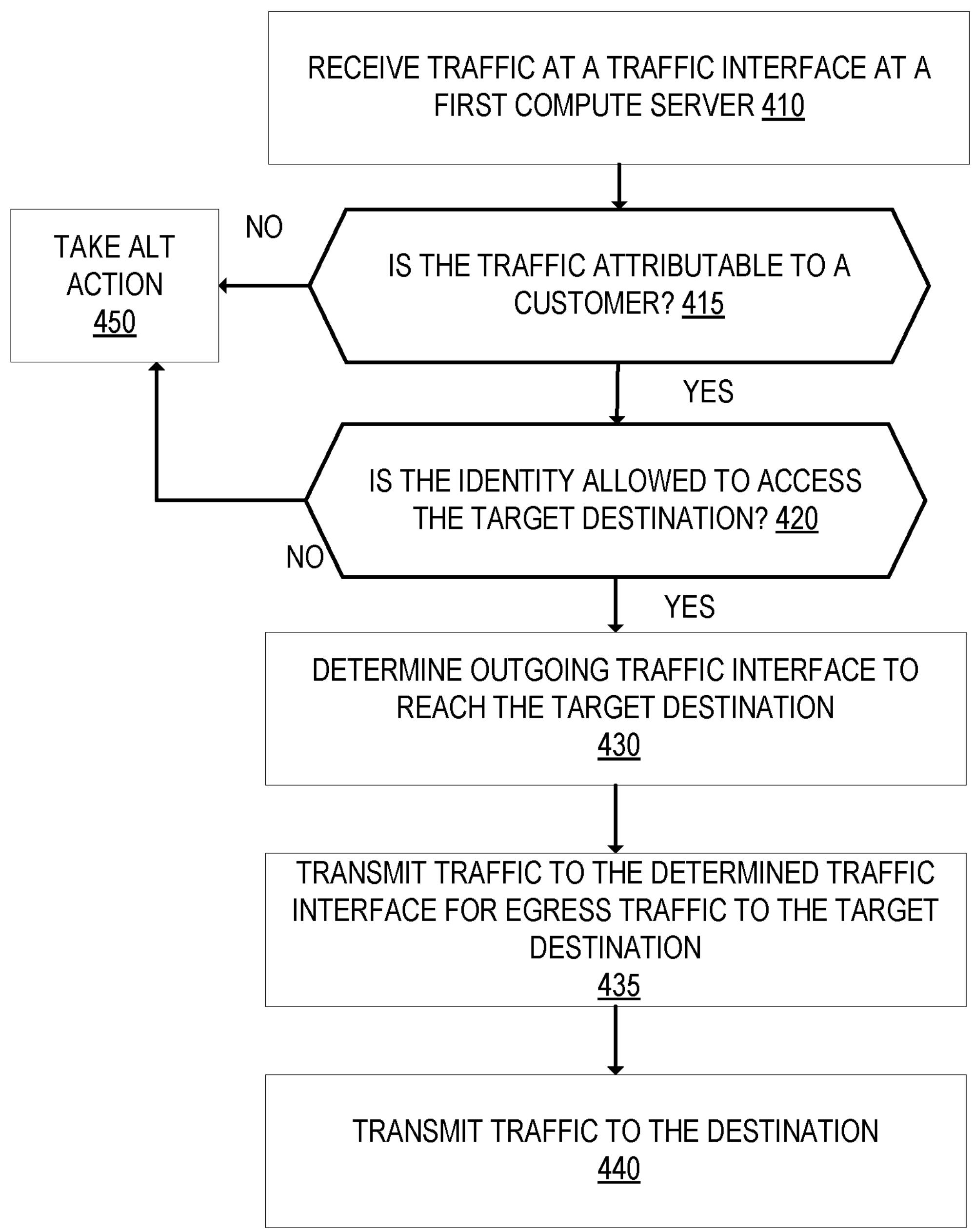
FIG. 4 is a flow diagram illustrating exemplary operations for processing traffic in a unified network service according to an embodiment.

FIG. 4 is a flow diagram illustrating exemplary operations for processing traffic in a unified network service according to an embodiment. The operations of FIG. 4 are described with respect to the exemplary embodiments of FIG. 3. However, the operations of FIG. 4 can be performed by embodiments different from that of FIG. 3, and the embodiments described in reference to FIG. 3 can perform operations different from that of FIG. 4.

At operation 410, a first compute server 215A receives traffic at a traffic interface 310. The traffic interface 310 may be, for example, a L2/L3 tunnel interface, a VPN server interface, an encrypted tunnel interface, a network interconnect interface, an IPSec tunnel interface, or a web server interface. Depending on the type of interface, the received traffic may be encrypted and be required to be decrypted before further processing.

Next, at operation 415, the first compute server 215A determines whether the traffic is attributable to a customer of the unified network service. For example, the source of the ingress traffic may be from a customer network and/or from a device associated with the customer such as a VPN client. As another example, the ingress traffic may be destined for a resource or web property of the customer. The ingress traffic may be associated with identity of the organization, identity of the client device that transmitted the traffic, and/or identity of the user responsible for transmitting the traffic, as previously described. If the traffic is not attributable to a customer, then operation 450 is performed where alternative action is performed (e.g., the traffic is dropped). If the traffic is attributable to a customer, operation 420 is performed.

At operation 420, the first compute server 215A determines whether the identity attributable to the traffic is allowed to access the target destination. For example, the security service 172 determines whether the identity associated with the traffic is allowed to access the target destination. The applicable policy for the target destination may be defined by the customer. The granularity of the identity required may be configured by the customer. For instance, the policy may be at the customer level (e.g., only allow traffic that is attributable from the customer). As another example, the policy may be at the end user level. For instance, the customer may specify what user(s) (e.g., identified by email address, phone number, name, device name, identifier, group, country, etc.) are allowed and/or not allowed to access the target IP address. Additionally, or alternatively, the customer may specify device posture requirements for access to the target IP address. The device posture may be provided from third-party endpoint security providers. In such a case, the security service 172 queries such third-party endpoint security providers for the device posture of the transmitting client device. If the identity associated with the traffic is allowed to access the target IP address, then operation 430 is performed. Otherwise, operation 450 is performed.

At operation 430, the first compute server 215A determines the outgoing traffic interface for the traffic to reach the target destination, which could be on a different compute server. For example, the routing service 170 accesses the unified network routing store 312 to determine the outgoing traffic interface for the traffic as previously described. The outgoing traffic interface may be a different kind of traffic interface compared to the incoming traffic interface. In an embodiment, traffic may be received on any of the traffic interfaces (e.g., the L2/L3 tunnel service 122, the VPN server 136, the tunnel service 146, the network interconnect 157, the web server 162, and the IPSec tunnel service 186) and sent out on a different one of the traffic interfaces. For instance, traffic arriving on a GRE tunnel interface may be sent to a layer 7 based tunnel interface to connect to the target destination. As another example, traffic arriving via an agent on an end user client device can be sent to an IPSec tunnel interface. Next, at operation 435, the traffic is transmitted to the determined traffic interface for egress traffic to the target destination. Next, at operation 440, the traffic is transmitted from the determined traffic interface for the egress traffic to the target destination.

In an embodiment, traffic attributed to a customer may be received at a compute server of the distributed cloud computing network in a network namespace for that customer. The network namespace is an isolated network stack specifically allocated for that customer, such as its own interfaces (with its own eBFP hooks), routing tables, netfilter configuration, etc. When a network namespace is created, a pair of virtual interfaces (e.g., virtual ethernet (veth) interfaces) are created; one in the default network namespace and one in the customer network namespace. The traffic may be received at the distributed cloud computing network in multiple ways as previously described. Although a network namespace may be used, other network isolation primitives may be used to attribute packets to specific customers.

A process (e.g., in some embodiments a single process) terminates the traffic interfaces in a way that allows the customer to be identified (e.g., so that customer-specific logic can be applied to the traffic) and that allows traffic to be differentiated among multiple customers that may be using the same private address space for source/destination IP addresses. This process is sometimes referred herein as the connection-terminating service (even if some of the interfaces are connectionless). Packets that are to be delivered to the connection-terminating service may be marked and encapsulated in a format that can carry identity information such as customer identity information, identity information of the transmitting client device, and/or identity information of the user attributed to the packet. In an embodiment, firewall rules are used to match packets that are to be delivered to the connection-terminating service. Determining which packets to send to the connection-terminating service may be based on IP addresses, ports, direction of traffic (inbound or outbound), origination of traffic (e.g., arrived over tunnel X), or any combination of the same. The encapsulation may be a Foo-Over-UDP (FOU). The encapsulated packets include the identity information, which can be encoded in the form of a unique source IP address associated with a specific customer, through use of specific UDP ports used only for a specific customer, or through adding a header to the payload that carries identity information, for example. The marking and encapsulation may be performed in the customer network namespace.

The marked packets with identifying information may be delivered to another network namespace, referred herein as a proxy namespace. In an embodiment, there is a single proxy namespace per compute server and all traffic destined for the connection-terminating service from all customers is delivered as encapsulated packets into the single proxy namespace. Once an encapsulated packet arrives in the proxy namespace, it is decapsulated. As part of decapsulation, the packet is NATed with certain properties. For instance, a single NAT table is maintained for all traffic entering the proxy namespace, which means that all customers share the same NAT table. NAT entries include the identifier information (e.g., the customer identifier) as part of the key in the NAT table. This allows multiple customers to concurrently send connections with the same source/destination IP addresses and ports without creating connection conflicts in the proxy namespace. The decapsulated, NATed packets then are received at the connection-terminating process running inside the proxy namespace with an open listening socket listening for new connections on all destination IP addresses and ports that the NAT function uses. When the connection-terminating process receives traffic for a new connection, this process then looks up the NATed connection information in the NAT table of the proxy namespace. This allows the connection-terminating process to learn the original IP addresses and ports before the traffic was NATed, as well as learn the identity of the customer to which the connection belongs. This information is sent with the packets to a service of the distributed cloud computing network (e.g., the security service 172). For example, this information may be sent as a preamble header with an extension to include the identity information.

To send traffic back to the customer (e.g., a SYN-ACK or other return traffic), the NATing process is reversed. The original tuple (source IP address, destination IP address, source port, destination port) is determined by accessing the single NAT table to retrieve the original packet information. Once un-NATed, the packet is encapsulated and sent to the customer namespace for the packet. The single NAT table is accessed to determine the identity information (e.g., the customer identification) using the packet header information as the key. This account identifier is translated to a destination IP address that is assigned to the encapsulation header. The encapsulated packet is sent to the customer namespace where it is decapsulated and the inner packet is routed back to the customer.

Thus, a single connection-terminating process can receive and process both public and private IP traffic from multiple customer networks while attributing ownership of each connection to the specific customer and/or network from which it originated.

Figure 5:
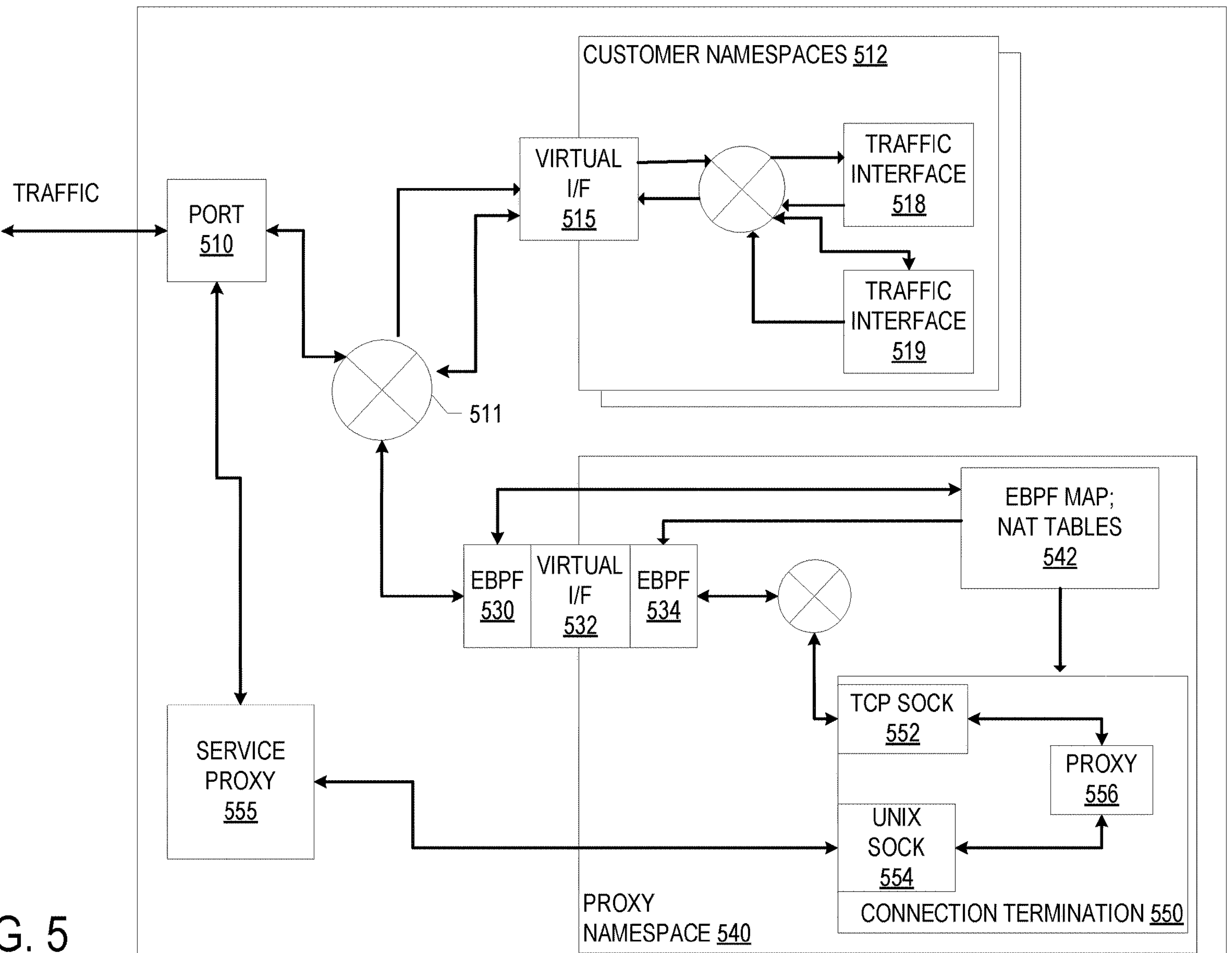
FIG. 5 is a block diagram that illustrates a connection-terminating process capable of receiving and processing public and private IP traffic from multiple customer networks while attributing ownership of each connection to the specific customer and/or network from which it originated, according to an embodiment.

FIG. 5 is a block diagram that illustrates a connection-terminating process capable of receiving and processing public and private IP traffic from multiple customer networks while attributing ownership of each connection to the specific customer and/or network from which it originated, according to an embodiment. Traffic is received at the port 510. The routing decision 511 routes the traffic to the namespace for that customer out of the customer namespaces 512 to which that traffic is attributable. For example, the source of the traffic may be from a customer network (e.g., received on a tunnel mapped to a customer network) and/or from a device associated with the customer such as a VPN client. As another example, the destination of the traffic may be to a resource or web property of the customer (e.g., based on the IP address of the traffic, hostname, SNI). Each customer namespace 512 is a network namespace in an isolated network stack specifically allocated for that customer and has its own interfaces, routing tables, netfilter configuration, etc. Each customer namespace 512 has a virtual interface 515 (e.g., a veth interface) for delivering packets to the customer namespace 512. Inside the customer namespace 512, the traffic interface 518 may match packets that are to be delivered to the connection termination process 550 and mark them with identity information. The traffic interface 519 may encapsulate the packets (e.g., FOU). The encapsulated packets are then sent to the proxy namespace 540.

The proxy namespace 540 includes a virtual interface 532 (e.g., a veth interface) and the extended Berkeley Packet Filter (eBPF) program 530 that decapsulates the encapsulated packets. The eBPF map/NAT tables 542 may include multiple maps including a forward table (e.g., original tuple to converted tuple), reverse table (e.g., converted tuple to original tuple), and an account table (converted tuple to encapsulated remote IP address). The eBPF program 530 looks up the tuple of the packet (source IP address, destination IP address, source port, destination port) in the forward table of the eBPF map/NAT tables 542 (source IP address, destination IP address, source port, destination port). If found, the original tuple is replaced by the converted tuple. The converted tuple is a NATed tuple. If there is not an entry, one is created where a converted tuple is created, an entry is created in the forward table, an entry is created in the reverse table, an entry is created in the account table, and the original tuple is replaced with the converted tuple. The NATed packet is then passed to the networking stack of the connection termination process 550. The connection termination process 550 listens for new connections at the TCP socket 552 on all destination IP addresses and ports that the NAT function uses. When it receives traffic for a new connection, the connection termination process 550 looks up the NATed connection information in the eBPF map/NAT tables 542 that allows the connection termination process 550 to learn the original IP addresses and ports before the traffic was NATed, as well as the identity information to which the connection belongs. For instance, the connection termination process 550 looks up the client tuple in the account table to get identity information, looks up the client tuple in the reverse table to get the original tuple. The connection termination process 550 then establishes a connection with the service proxy 555 over the unix socket 554. A header may be sent with the original tuple and the account identification to the service proxy 555. After this header is sent, the connection may be proxied by the proxy 556 by copying bytes between the service proxy 555 and the client until the connection is closed.

To send traffic back to the customer (e.g., a SYN-ACK or other return traffic), the NATing process is reversed and is then encapsulated with a destination of a device in the customer's namespace. The original tuple (source IP address, destination IP address, source port, destination port) is determined by accessing the single NAT table to retrieve the original packet information. For instance, the eBPF program 534 looks up the tuple of the IP packet in the eBPF map/NAT tables 542 (e.g., the tuple of the IP packet in the reverse table). If found, the converted tuple is replaced with the original tuple. If not found, then the packet is dropped. Once un-NATed, the packet is encapsulated and sent to the customer namespace for the packet. The eBPF map/NAT tables 542 is accessed to determine the identity information (e.g., the customer identification) using the packet header information as the key. This account identifier is translated to a destination IP address that is assigned to the encapsulation header. The encapsulated packet is sent to the customer namespace 512 where it is decapsulated and the inner packet is routed back to the customer.

As a specific example, consider an end user client device that has an agent that connects to the distributed cloud computing network 150 such as a client device 130 that includes a VPN client 132 that connects to the distributed cloud computing network 150 over the VPN tunnel 134. In some cases, such a client device 130 may transmit traffic that is destined to an application or service on the origin server 140 that is protected through the encrypted tunnel 144. After traffic is received at the VPN server 136 from the client devices, the traffic is processed by one or more services 168 as defined by the customer. For instance, the security service 172 may apply policies to the traffic based on the identity tagged with the traffic.

Assuming that the traffic is allowed to proceed to the application or service the route from the compute server that received the traffic to the application or service on the origin server 140 is determined. The route associates a set of one or more private IP addresses with a tunnel that is capable of forwarding traffic to these private IP address(es). A single tunnel can provide a route to many destination IP addresses. The granularity of a route, e.g., the size of its IP range, is based on the topology of the network of the customer. In some embodiments, a single route cannot span unconnected parts of the network, such as two separate offices.

The routes are known to the compute servers. Each route in this case includes a customer identifier (used to separate private networks of multiple customers), a set of one or more private IP addresses of the private resource or service, and a tunnel identifier of the tunnel that connects the resource or service with the distributed cloud computing network 150. A single tunnel can be associated with multiple resources. Also, a route could have multiple tunnels in some embodiments. If a compute server receives traffic and policy allows access to the private resource or service (e.g., the packet meets the policy criteria for access to the set of private IP addresses for that customer), the packet is transmitted from the services 168 (e.g., the security service 172) to the tunnel service 146 that is running locally on that compute server, along with the customer identifier, the tunnel identifier, and the original source and destination IP addresses. It is possible that the tunnel connecting the resource or service with the distributed cloud computing network 150 is not connected to the compute server that received the traffic (instead the tunnel may be connected to other compute server(s) possibly in different datacenters). If the local tunnel service 146 does not have the tunnel connection, the local tunnel service 146 determines which one or more remote compute server(s) the tunnel identified by the tunnel identifier is connected. The local tunnel service 146 transmits the packet to those one or more compute server(s) that will be received at the remote tunnel service 146 running on those compute server(s) (e.g., the connection may be proxied over an HTTP/2 proxy). The remote tunnel service 146 proxies the TCP request to the tunnel client 142 (e.g., setting the destination IP in a header).

Figure 6:
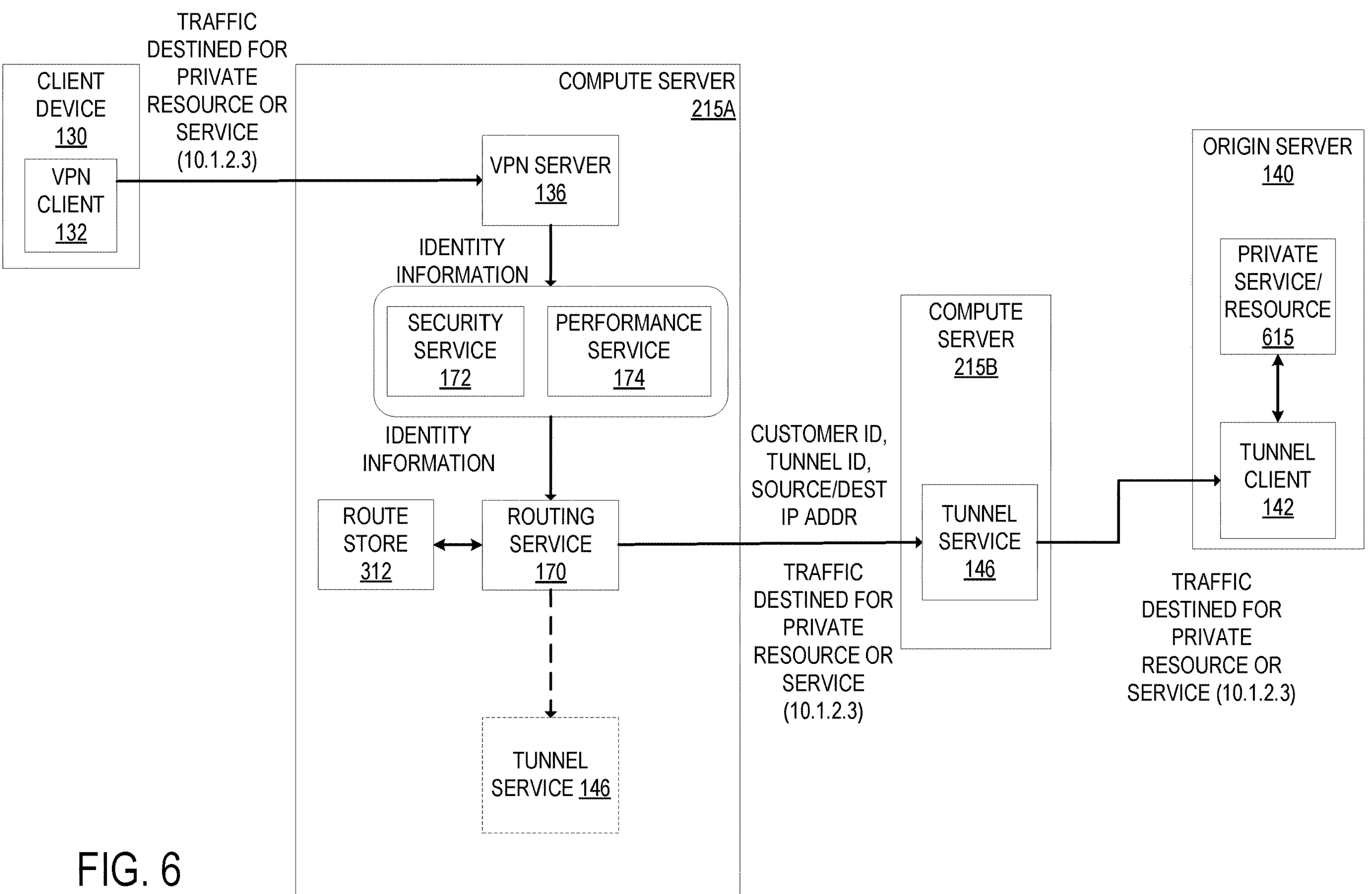
FIG. 6 illustrates an example of processing traffic received from an end user client device that is not on a customer's private network and that is destined to a private resource or application of the customer according to an embodiment.

For example, FIG. 6 illustrates an example of processing traffic received from an end user client device that is not on a customer's private network and that is destined to a private resource or application of the customer. The client device 130 includes the VPN client 132 that establishes a VPN tunnel with the VPN server 136 as previously described. In this example, the VPN tunnel is established between the VPN client 132 and the compute server 215A. Traffic is transmitted from the client device 130, which is intercepted by the VPN client 132 and transmitted over the VPN tunnel to the VPN server 136. In this example, this traffic is destined for a private resource or service 615 that is located at the private IP address 10.1.2.3. This private resource or service 615 is located at the origin server 140. The VPN server 136 may transmit the traffic to the security service 172 using one or more sockets (e.g., a socket for HTTP requests, a socket for TCP traffic) and/or the performance service 174. The traffic may be associated with identity information provided by the VPN client 132 (e.g., customer identifier, user identifier, and/or device identifier). The performance service 174, which is optional in some embodiments, performs one or more performance services on the traffic as previously described using the identity information. The security service 172 can apply policies to the received traffic to determine whether access is allowed to the private resource or service 615, which may be based on the identity information. The policies may be created by the customer and apply to layer 3, layer 4, layer 7 (for example) and can be based on identity, device posture, location, and/or risk signals. If the security service 172 determines that the traffic is not allowed to the destination, the traffic is typically dropped. If the traffic is allowed to the destination, the security service 172 forwards the traffic to the routing service 170. The identity information is also forwarded to the routing service in an embodiment.

The routing service 170 determines the outgoing traffic interface for the traffic, which may be on a different compute server. For example, it is possible that the tunnel connecting the resource or service with the distributed cloud computing network is not connected to the compute server that received the traffic (instead the tunnel may be connected to other compute server(s) possibly in different datacenters). In the example of FIG. 6, the routing service 170 accesses the routes for the customer in the unified network routing store 312 and determines that the tunnel for the IP address is not at this compute server 215A but rather that the tunnel connecting the private service/resource 615 is terminated on the compute server 215B. The compute servers 215A and 215B may be in different datacenters. The routing service 170 transmits the traffic to the tunnel service 146 running on the compute server 215B. The connection may be proxied over an HTTP/2 proxy. The tunnel service 146 of the compute server 215B forwards the traffic to the tunnel client 142 for the private service/resource 615.

Figure 7:
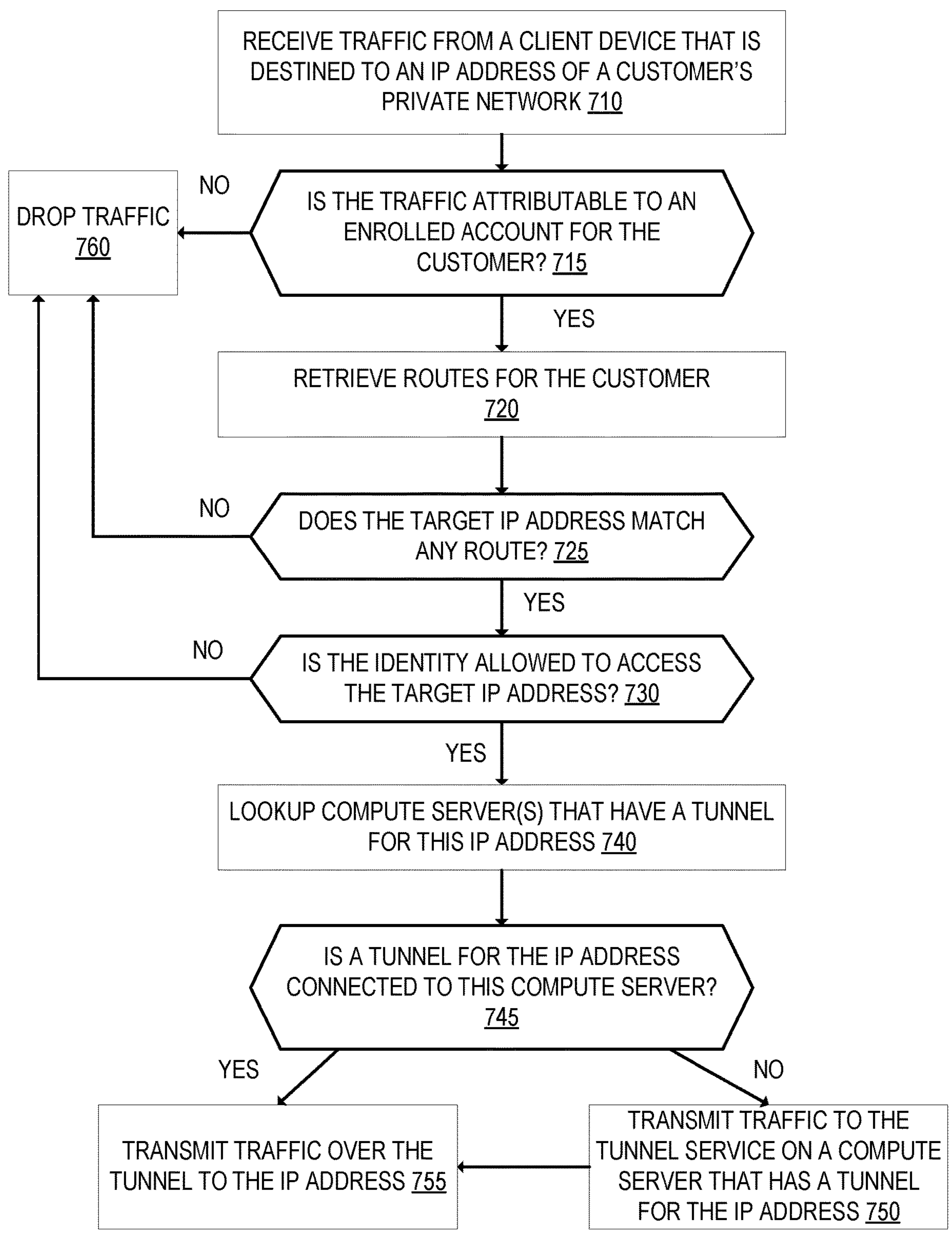
FIG. 7 is a flow diagram that illustrates exemplary operations for processing traffic received from an end user client device that is not on a private network of a customer that is destined to a private resource or application of the customer according to an embodiment.

FIG. 7 is a flow diagram that illustrates exemplary operations for processing traffic received from an end user client device that is not on a private network of a customer that is destined to a private resource or application of the customer. The operations of FIG. 7 are described with respect to the exemplary embodiments of FIG. 6. However, the operations of FIG. 7 can be performed by embodiments different from that of FIG. 6, and the embodiments described in reference to FIG. 6 can perform operations different from that of FIG. 7.

At operation 710, traffic is received at a first compute server from a client device that is destined to an IP address of a private network of a customer. In this example, the traffic has a destination IP address of 10.1.2.3. For instance, the traffic may be received from an agent installed on the client device (e.g., the VPN client 132) at a VPN server 136 installed at the compute server 215A. In an embodiment, an initial tunnel route configuration may be transmitted to the VPN client 132 that specifies the compute server 215A as the endpoint of the tunnel. In another embodiment, the initial tunnel route configuration specifies an anycast IP address shared between the compute servers 215A-N. In such an embodiment, the compute server 215A connects to the VPN client 132 because it is the one of the compute servers 215A-N that is closest to the client device in terms of routing protocol configuration (e.g., BGP configuration) according to an anycast implementation. The traffic may be associated with identity information provided by the VPN client 132 (e.g., customer identifier, user identifier, and/or device identifier). The VPN server 136 may transmit the traffic to the security service 172 using one or more sockets (e.g., a socket for HTTP requests, a socket for TCP traffic). The traffic may be tagged with identity information provided by the VPN client 132 (e.g., customer identifier, user identifier, and/or device identifier).

Next, at operation 715, a determination is made whether the received traffic is attributable to an enrolled account for the customer. It is possible that traffic directed to the private IP address is sent from a device that is not associated with the customer. In such a case, operation 760 is performed where the traffic is dropped. If the received traffic is attributable to an enrolled account for the customer, then operation 720 is performed. At operation 720, the security service 172 retrieves route(s) for the customer. In this case, each route includes a customer identifier (used to separate private networks of multiple customers), a set of one or more private IP addresses of the private resource or service, and a tunnel identifier of the tunnel that connects the resource or service with the distributed cloud computing network. In an embodiment, the security service 172 queries the routing service 170 to determine the route(s) for the customer, which in turn accesses the unified network routing store 312 to determine the route(s) and returns the route information to the security service 172. Next, at operation 725, the security service 172 determines whether the target IP address matches any route for the customer. For instance, whether a route exists for the destination IP address of the traffic for that customer. If no such route exists, then operation 760 is performed where the traffic is dropped. If such a route exists, then operation 730 is performed.

At operation 730, the security service 172 determines whether the identity associated with the traffic is allowed to access the target IP address. The applicable policy for the target IP address may be defined by the customer. The granularity of the identity required may be configured by the customer. For instance, the policy may be at the customer level (e.g., only allow traffic that is attributable from the customer). As another example, the policy may be at the end user level. For instance, the customer may specify what user(s) (e.g., identified by email address, phone number, name, device name, identifier, group, country, etc.) are allowed and/or not allowed to access the target IP address. Additionally, or alternatively, the customer may specify device posture requirements for access to the target IP address. The device posture may be provided from third-party endpoint security providers. In such a case, the security service 172 queries such third-party endpoint security providers for the device posture of the transmitting client device. If the identity associated with the traffic is allowed to access the target IP address, then operation 740 is performed. Otherwise, operation 760 is performed and the traffic is dropped.

At operation 740, the security service 172 transmits the traffic to the routing service 170 which performs a lookup to determine the compute server(s) that have a tunnel established for the target IP address for the customer. The routing service 170 may access the routes for the customer in the unified network routing store 312 for this determination. Next, at operation 745, the routing service 170 determines whether a tunnel for the target IP address for the customer is connected at this compute server. For example, with respect to FIG. 6, an appropriate tunnel is not established between the origin server 140 and the compute server 215A. If an appropriate tunnel is not available to the local compute server, then operation 750 is performed where the routing service 170 transmits the traffic to an instance of the tunnel service 146 running on a compute server that has a tunnel for the IP address for the customer. With respect to FIG. 6, the routing service 170 of the compute server 215A transmits the traffic to the tunnel service 146 running on the compute server 215B. The connection may be proxied over an HTTP/2 proxy. Also transmitted are the customer identifier, the tunnel identifier, and the original source and destination IP addresses. Next, at operation 755, the traffic is transmitted over the tunnel to the IP address. For instance, the tunnel service 146 of the compute server 215B proxies the traffic to the tunnel client 142 for the private service/resource 615.

FIG. 7 includes a description of an embodiment where the security service 172 determines the customer route(s). Alternatively, the security service 172 passes the traffic to the routing service 170 to determine the customer route(s). For instance, in another embodiment, after determining that the received traffic is attributable to an enrolled account for the customer at operation 715, operation 730 may then be performed by the security service 172 instead of the operation 720. If the identity associated with the traffic is allowed to access the target IP address, then operations 720 and 725 are performed by the routing service 170.

Embodiments have been described where packets are received at a first compute server and transmitted to a second compute server for delivery to a device in the customer network. The specific route in which IP packets (e.g., from the first compute server to the second compute server) may be determined by conventional routing protocols such as standard BGP, or in some embodiments, intelligently routed through one or more intermediary data centers based on a set of factor(s) such as latency, speed, reliability, and or cost. For instance, in an embodiment, one of the performance and/or security services that can be performed is intelligently routing traffic to a customer network and/or intelligently routing traffic from a customer network to a client device.

Figure 8:
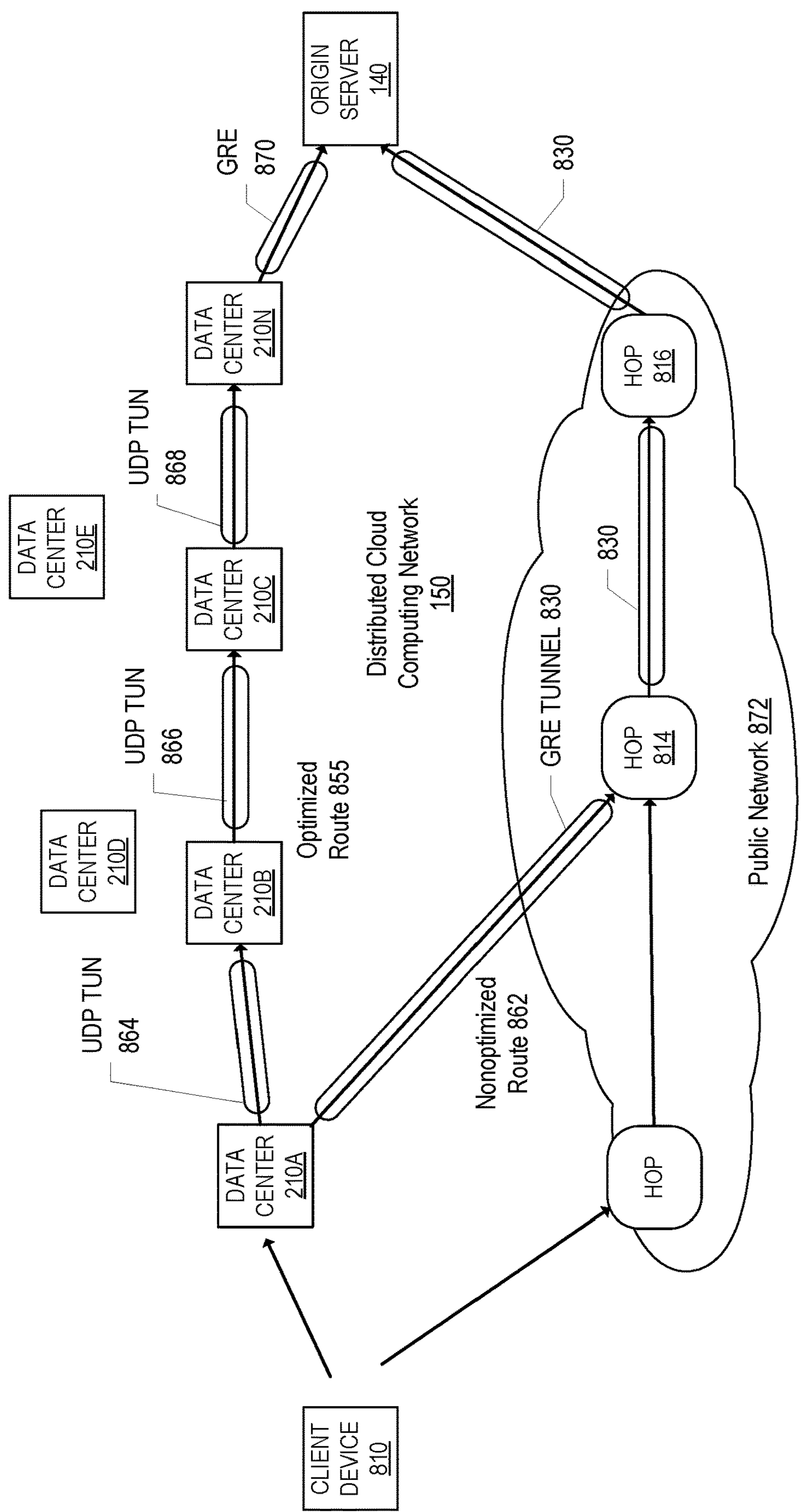
FIG. 8 illustrates an example of packets intelligently routed according to an embodiment.

FIG. 8 illustrates an example of packets intelligently routed according to an embodiment. Traffic may traverse the internet between the data centers 210A-N. There may be multiple network providers that provide transit connections between the data centers 210A-N. The different transit connections may have different properties (e.g., different performance characteristics such as latency, speed, and/or reliability; and cost). An optimized route between an entry data center and an exit data center may be determined and used. The entry data center is the data center that initially receives the traffic, and the exit data center is the data center that is connected with the destination (e.g., a customer network). For instance, with respect to FIG. 8, the data center 210A is the entry data center (it receives the traffic from the client device 810) and the data center 210N is the exit data center (it is the last data center of the data centers 220A-N to the origin server 140) of the optimized route. The optimized route may be based on a set of factors such as latency, speed, reliability, and/or cost, for each of the transit connections. The optimized route may not be the same as the route taken by conventional routing protocols such as standard BGP. For instance, FIG. 8 illustrates a nonoptimized route 862 from the data center 210A (the entry data center) going through the hops (internet nodes) 814 to 816 of the public network 872 (e.g., the public internet) to the origin server 140. As illustrated in FIG. 8, the traffic for the nonoptimized route is carried through the GRE tunnel 830 from the data center 210A to the origin server 140, traversing the hops 814 and 816. The nonoptimized route 862 may be determined based on conventional routing protocols such as standard BGP. FIG. 8 also illustrates the optimized route 855 that goes from the data center 210A to the data center 210B to the data center 210C to the data center 210N to the origin server 140. Not all of the data centers 210A-N are necessarily part of the optimized route. For instance, the data centers 210D-E are not part of the optimized route. In an embodiment, the packets are encapsulated (e.g., using UDP) for transit between the data centers on the optimized route and include information that aids in routing. As illustrated in FIG. 8, a tunnel 864 is established between the data centers 210A and 210B (e.g., the UDP tunnel 864), a tunnel 866 is established between the data centers 210B and 210C (e.g., the UDP tunnel 866), and a tunnel 868 is established between the data centers 210C and 210N (e.g., the UDP tunnel 868). Since the data center 210N is the exit data center, it transmits the IP packets over the GRE tunnel 870 to the origin server 140.

In an embodiment, the encapsulating header includes the full path the packet should traverse through the distributed cloud computing network 150. The full path can be encoded as a list of hops where each hop is an identifier of a data center 210 (e.g., not a full IP address). In this embodiment, the entry data center 210 determines the full path (e.g., looks up the path in optimized route storage based on the destination address) and encodes the full path in the encapsulating header. Each intermediate data center 210 can then use the path encoded in the encapsulating header to route the traffic instead of accessing the optimized route storage to determine the next hop.

In an embodiment, the encapsulating header includes a hash or identifier of the full path that is stored in optimized route storage on each of the data centers 210A-N that is keyed by the hash or identifier. In such an embodiment, the entry data center 210 determines the full path (e.g., looks up the path in optimized route storage based on the destination address) and encodes the hash or identifier in the encapsulating header. Each intermediate data center can then use the encoded hash or identifier to determine the path.

In an embodiment, the encapsulating header includes a hash or other identifier that represents a specific routing policy (e.g., stored in optimized route storage) that is used for the optimized route. For instance, a routing policy may be: fastest by latency, lowest jitter, lowest packet loss, cheapest by bandwidth, data sovereignty policies (e.g., don't route through a particular geographic region), etc. In such an embodiment, the entry data center 210 determines the routing policy to apply (e.g., looks up the routing policy in the optimized route storage based on the destination address and/or source address), and includes the hash or other identifier in the metadata of the encapsulating header. This allows each data center of the optimized route to consistently apply the same routing policy(ies).

In an embodiment, the encapsulating header includes a hash or other identifier of the origin network (e.g., a hash or other identifier of the IP address of the origin server and/or origin router). For instance, in some embodiments, the packet is encrypted (including the source and destination IP address). Each data center 210 could decrypt the packet to determine the destination IP address. However, since decrypting/encrypting can be expensive, the hash or other identifier can be used to lookup the next hop without having to decrypt the encrypted payload.

Figure 9:
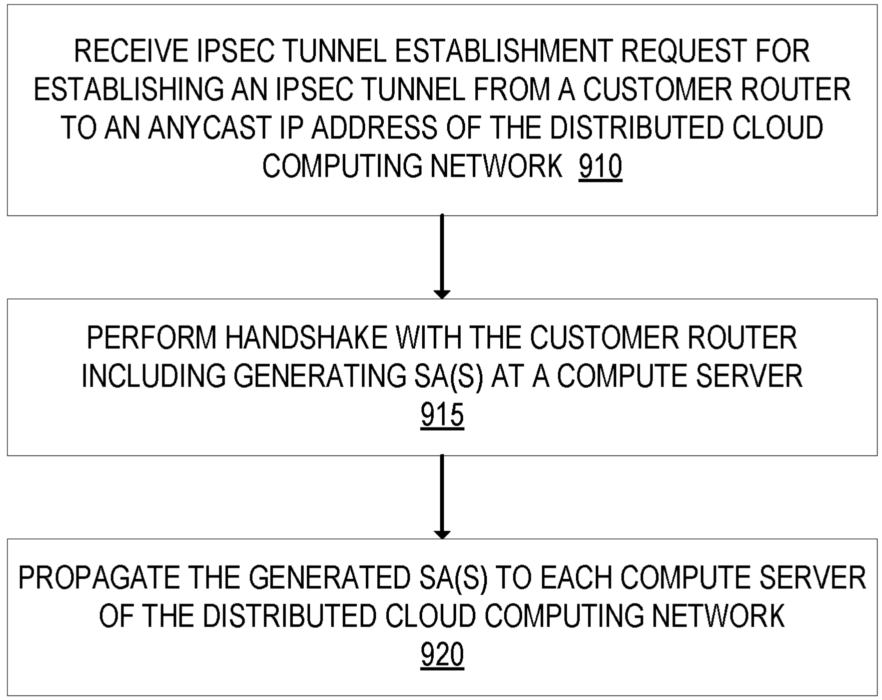
FIG. 9 is a flow diagram illustrating exemplary operations for configuring and processing IPsec traffic according to an embodiment.

FIG. 9 is a flow diagram illustrating exemplary operations for configuring and processing IPsec traffic according to an embodiment. At operation 910, an IPsec tunnel establishment request is received for establishing an IPsec tunnel from a customer router (e.g., the customer router 182) to an anycast IP address of the distributed cloud computing network 150 (associated with the IPsec tunnel service 186). The anycast IP address is shared among the compute servers 215A-N of the distributed cloud computing network 150. This request is received at a compute server that is closest to the customer router in terms of an anycast implementation. In this example, the compute server 215A.1 receives the request. In an embodiment, each compute server is able to perform a handshake (e.g., a key-agreement protocol such as Internet Key Exchange) with the customer router 182. For instance, key-agreement protocol configuration (e.g., customer identifier, preshared key, etc.) may be propagated to each compute server.

Next, at operation 915, that compute server (e.g., compute server 215A.1) performs a handshake (e.g., a key-agreement protocol such as Internet Key Exchange (IKE)) with the customer router. For instance, the IPsec tunnel service 186 of that compute server 215A.1 performs the handshake with the router 182 of the private network 180. Performing the handshake includes generating security association(s) for encrypting and decrypting IPsec traffic. In an embodiment, the IPsec tunnel service 186 forwards the generated security association(s) to the unified routing control 240 to store in the unified network routing store 245. The unified network routing store 245 may also store data about the IPsec tunnel (e.g., customer identifier, IP address of the IPSec interface of the distributed cloud computing network 150 performing the handshake) and data about the IPSec route (e.g., customer identifier, IP address of the IPSec interface on the customer's router, the network/CIDR that the IPSec interface advertises). That compute server 215A.1 may also install the security associations into its kernel space.

Next, at operation 920, the generated security association(s) are propagated to each of the other compute servers 215A-N of the distributed cloud computing network 150. In an embodiment, the control server 230 propagates the generated security association(s). In another embodiment, the compute server that generated the security association(s) propagates the generated security association(s) to the other compute servers. For instance, the compute server 215A.1 may propagate the security association(s) to each compute server 215A-N. Alternatively, the compute server 215A.1 may propagate the security association(s) to a control server within each data center 210A-N that then propagates the security association(s) to the compute servers within that data center. The security association(s) are installed to the kernel space at each compute server.

At this point, although the customer established a single IPsec tunnel that was originally terminated at a single compute server, IPsec traffic can be received and sent from each compute server of the distributed cloud computing network.

Figure 10:
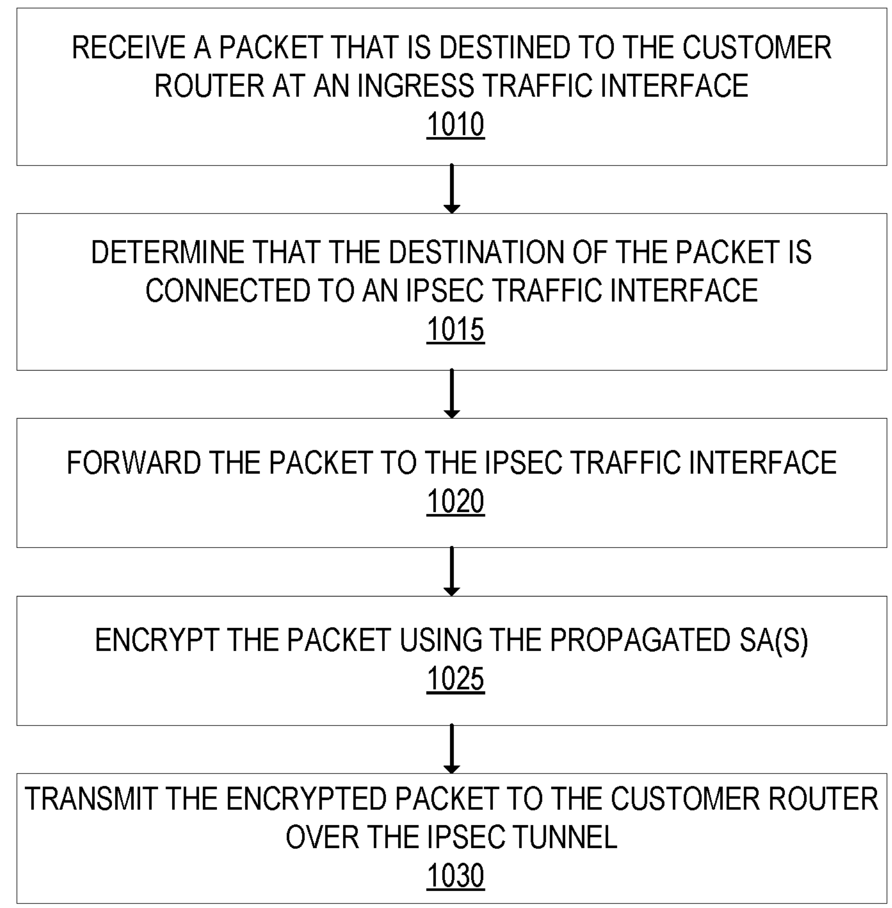
FIG. 10 is a flow diagram that illustrates exemplary operations for processing a packet that is destined for a device connected to the distributed cloud computing network with an IPsec tunnel, according to an embodiment.

FIG. 10 is a flow diagram that illustrates exemplary operations for processing a packet that is destined for a device connected to the distributed cloud computing network with an IPsec tunnel, according to an embodiment.

At operation 1010, a packet that is destined to the customer router (e.g., the customer router 182) is received at a compute server that did not perform the handshake, such as the compute server 215B.1. The packet may be received at any of the traffic interfaces (e.g., the L2/L3 tunnel service 122, the VPN server 136, the tunnel service 146, the network interconnect 157, the web server 162, and the IPSec tunnel service 186). The packet may be subject to one or more services 168 to determine whether the destination IP address of the packet belongs to the customer's network (in this case it is being sent to an IP address of the customer router 182) and if so, how to reach it (e.g., through use of the routing service 170 and the unified network routing store as previously described). The packet may also be subject to the security service 172 to determine whether the packet is permitted to be transmitted. At operation 1015, the compute server 215B.1 determines that the destination of the packet is connected to an IPsec traffic interface (e.g., the IPsec tunnel service 186). For instance, the routing service 170 may access the unified network routing store to determine that the destination IP address is associated with the IPsec traffic interface.

Next, at operation 1020, the packet is forwarded to the IPsec traffic interface (e.g., the IPsec tunnel service 186). The IPsec traffic interface encrypts the packet using the propagated security association data at operation 1025. At operation 1030, the IPsec traffic interface transmits the encrypted packet to the customer router over the IPsec tunnel. For instance, the IPsec tunnel service 186 transmits the encrypted packet over the IPsec tunnel 188 to the customer router 182.

Figure 11:
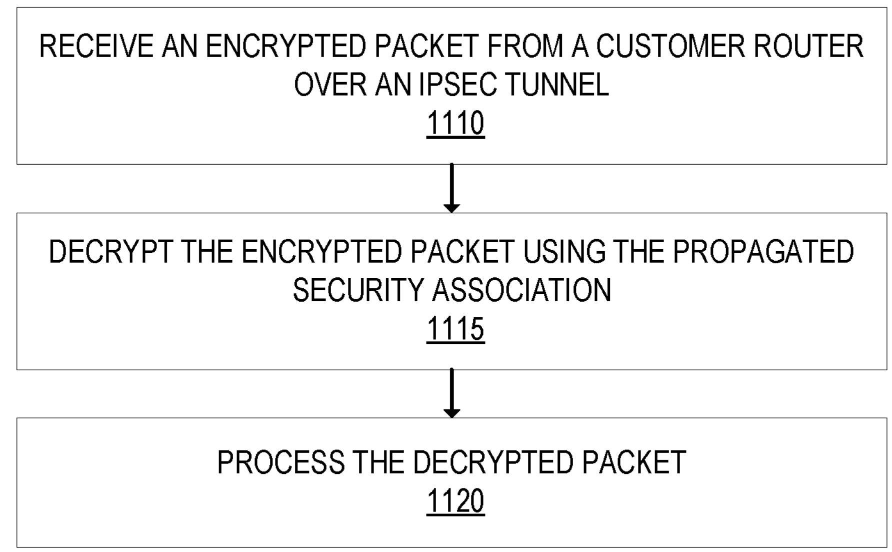
FIG. 11 is a flow diagram that illustrates exemplary operations for processing a packet that is received from a device connected to the distributed cloud computing network with an IPsec tunnel, according to an embodiment.

FIG. 11 is a flow diagram that illustrates exemplary operations for processing a packet that is received from a device connected to the distributed cloud computing network with an IPsec tunnel, according to an embodiment.

At operation 1110, a compute server receives an encrypted packet from a customer router over an IPsec tunnel. For example, the compute server 215C.1 receives an encrypted packet from the customer router 182 over the IPsec tunnel 188 at the IPsec tunnel service 186 running on the compute server 215C.1. In this example, the compute server 215C.1 did not perform the handshake with the customer router 182 to generate the security associations for encrypting and decrypting traffic. However, the compute server 215C.1 has access to the appropriate security association to decrypt the traffic.

At operation 1115, the compute server uses the propagated security association to decrypt the encrypted packet. For instance, the IPsec tunnel service 186 decrypts the encrypted packet thereby revealing an unencrypted packet. Next, at operation 1120, the compute server processes the unencrypted packet. Processing the unencrypted packet may include performing operations that are similar to the operations 415-450. For instance, the packet may be processed at the services 168 including the security service 172 to determine whether the packet is permitted to be transmitted to the destination. Further, the packet may be forwarded to an egress traffic interface (e.g., as determined by the routing service 170) for transmission to the destination.

In an embodiment, the distributed cloud computing network 150 handles traffic between two customers having different network namespaces. Each customer can define policies that define traffic destined for the parts of their network that they wish to expose to the other customer and define security and access policies for the traffic. A cross-customer tunnel (e.g., a GRE tunnel) is deployed on a compute server where one end terminates inside a first customer namespace and the other end terminates inside a second customer namespace. The customers can configure routing policies to determine what traffic in their own namespace gets routed to the other customer's namespace, effectively interconnecting the two networks through a virtual traffic exchange. Although a network namespace may be used, other network isolation primitives may be used to attribute packets to specific customers.

For example, a first customer can configure egress routing for devices in their network to send traffic destined to a particular IP address of a second customer to arrive at a network namespace of the first customer of the distributed cloud computing network 150. Traffic that meets this egress routing rule arrives at one of the compute servers of the distributed cloud computing network 150 (e.g., a compute server in a data center that is closest to the client device in terms of routing protocol configuration according to an anycast implementation). After the traffic arrives, one or more egress policies are applied to the traffic (e.g., defined by the first customer) such as specifying certain user(s) that are allowed to access that particular IP address of the second customer. If the traffic is allowed to be transmitted to the destination of the second customer, the traffic is routed through the cross-customer tunnel (e.g., a GRE tunnel) where it is delivered to the network namespace of the second customer. After the traffic arrives at the network namespace of the second customer, one or more ingress policies are applied to the traffic (e.g., defined by the second customer) such as specifying certain user(s) that are allowed to access that particular IP address of the second customer. If the traffic is permitted to be transmitted to the destination, the traffic is routed to the destination. Return packets from the second customer's network follow a similar flow but in reverse.

The embodiment described herein allows for a customer to build a secure and private traffic cross-connect with another network regardless of physical distance or colocation, all while applying security and access policies before traffic enters their own network.

Figure 12:
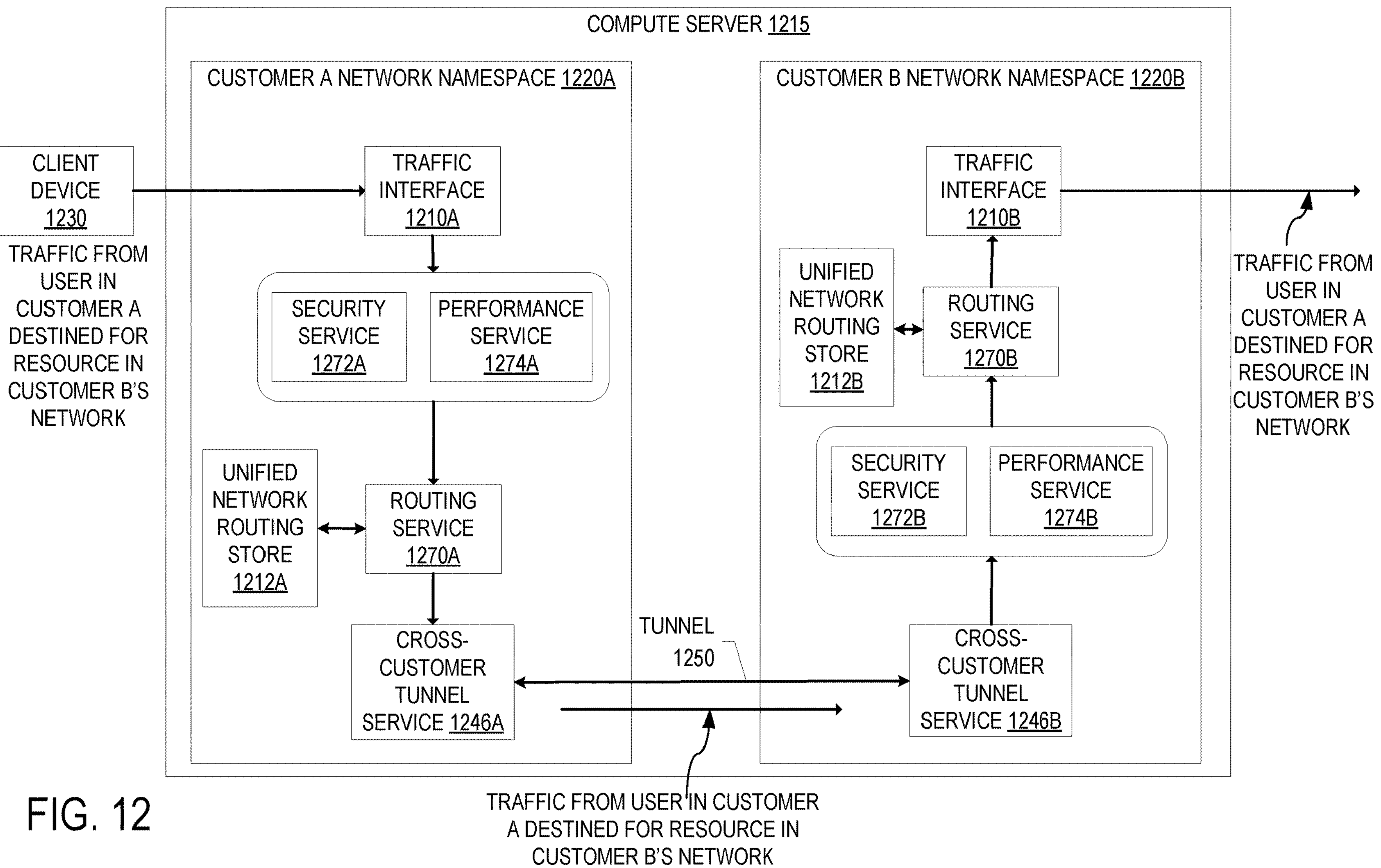
FIG. 12 illustrates an example of processing traffic received from an end user client device associated with a first customer network and that is destined to a private resource or application associated with a second customer network according to an embodiment.

FIG. 12 illustrates an example of processing traffic received from an end user client device associated with a first customer network namespace and that is destined to a private resource or application associated with a second customer network namespace according to an embodiment. A first customer network namespace is associated with a first customer (e.g., customer A network namespace 1220A) and a second customer network namespace is associated with a second customer (e.g., customer B network namespace 1220B). A cross-customer tunnel 1250 (e.g., a GRE tunnel) is configured on the compute server 1215 where a first endpoint terminates inside the customer A network namespace 1220A and the second endpoint terminates inside the customer B network namespace 1220B.

In the example of FIG. 12, a user in the first customer's network with IP address 192.168.0.1 wants to access a resource (e.g., a web application) in a second customer's network with IP address 10.0.0.1. The first customer configured egress routing rules in the first customer's network such that devices in their network that send traffic with a destination of IP address 10.0.0.1 arrive at a first customer network namespace associated with the first customer (e.g., customer A network namespace 1220A).

The traffic can be received at one or a plurality of compute servers of the distributed cloud computing network that is closest to the user (e.g., compute server 1215). For instance, traffic arrives at the first traffic interface 1210A. The first traffic interface 1210A may be any type of traffic interface for receiving/transmitting traffic from private and/or public networks, including the L2/L3 tunnel service 122, the VPN server 136, and the IPsec tunnel service 186. In the example of FIG. 12, the ingress traffic is attributable to a customer of the unified network service, namely customer A. For example, the source of the ingress traffic may be from a customer network and/or from a device associated with the customer such as a VPN client. In the example of FIG. 12, the ingress traffic is destined for a resource or web property of a different customer of the unified network service, namely customer B.

The traffic interface 1210A passes the traffic and identity information associated with the traffic to the security service 1272A and/or the performance service 1274A. The security service 1272A and the performance service 1274A are like the security service 172 and the performance service 174. In some embodiments, the traffic is tagged with the identity information. The performance service 1274A, which is optional in some embodiments, performs one or more performance services on the traffic as previously described using the identity information.

The security service 1272A, which is optional in some embodiments, performs one or more security services. For example, the security service 1272A can apply one or more policies to the received traffic to determine whether access is allowed to the target destination. For example, traffic received at the distributed cloud computing network that is addressed to the IP address 10.0.0.1 can be subject to an identity policy. The policies may be created by the customer and apply to layer 3, layer 4, layer 7 (for example) and can be based on identity, device posture, location, and/or risk signals. For example, the first customer may specify particular user(s) and/or group(s) of user(s) that are allowed to access the destination resource at the IP address 10.0.0.1. In such a case, the security service 1272A only allows traffic to reach the destination resource at the IP address 10.0.0.1 if that traffic is received from that particular user(s) and/or group(s) of user(s).

If the security service 1272A determines that the traffic is not allowed to the destination, the traffic is typically dropped. If the traffic is allowed to the destination, the security service 1272A forwards the traffic to the routing service 1270A. The identity information is also forwarded to the routing service in an embodiment. The routing service 1270A determines an outgoing traffic interface for sending the traffic to the destination. The routing service 1270A accesses the routes for the customer A in the unified network routing store 1212A and determines that the destination is associated with the customer B for which the customer B network namespace 1220B is accessible by the cross-customer tunnel 1250 (e.g., a GRE tunnel). The routing service 1270A forwards the traffic over the cross-customer tunnel service 1246A. The traffic metadata (e.g., the customer identifier, the traffic interface identifier, the set of one or more IP addresses, and the source/destination of the origin traffic) is also forwarded to the cross-customer tunnel service 1246A. The cross-customer tunnel service 1246A transmits the traffic over the cross-customer tunnel 1250 (e.g., encapsulating the traffic) to the cross-customer tunnel service 1246B of the customer B network namespace 1220B.

The cross-customer tunnel service 1246B of the customer B network namespace 1220B receives the traffic over the cross-customer tunnel 1250. The cross-customer tunnel service 1246B may decapsulate the tunneled traffic. The cross-customer tunnel service 1246B passes the traffic and identity information associated with the traffic to the security service 1272B and/or the performance service 1274B. In some embodiments, the traffic is tagged with the identity information. The security service 1272B and the performance service 1274B are configured for the network of customer B. For example, customer B may have a different security and access policy from that of customer A. The performance service 1274B, which is optional in some embodiments, performs one or more performance services on the traffic as previously described using the identity information. The security service 1272B, which is optional in some embodiments, performs one or more security services. For example, the security service 1272B can apply one or more policies configured for customer B to the received traffic to determine whether access is allowed to the target destination. For example, traffic received at the distributed cloud computing network that is addressed to the IP address 10.0.0.1 can be subject to an identity policy. The policies may be created by the customer and apply to layer 3, layer 4, layer 7 (for example) and can be based on identity, device posture, location, and/or risk signals.

Ingress routing rules configured by the second customer are applied to the traffic. For example, the second customer may specify particular user(s) and/or group(s) of user(s) that are allowed to access the resource at the IP address 10.0.0.1. If the traffic passes the second customer's ingress traffic rules, the security service 1272B forwards the traffic to the routing service 1270B. The identity information is also forwarded to the routing service in an embodiment. The routing service 1270B determines an outgoing traffic interface for sending the traffic to the destination. The routing service 1270B accesses the routes for the customer B in the unified network routing store 1212B and determines that the destination is reachable over the traffic interface 1210B. The traffic interface 1210B is one of multiple traffic interfaces for different types of traffic and/or connections such as an L2/L3 tunnel service, a VPN server, a tunnel service, a network interconnect 157, a web server 162, and an IPsec tunnel service 186. A response from the resource of the second customer is directed back to the user associated with the first customer following a similar path as described above, but in reverse.

Figure 13:
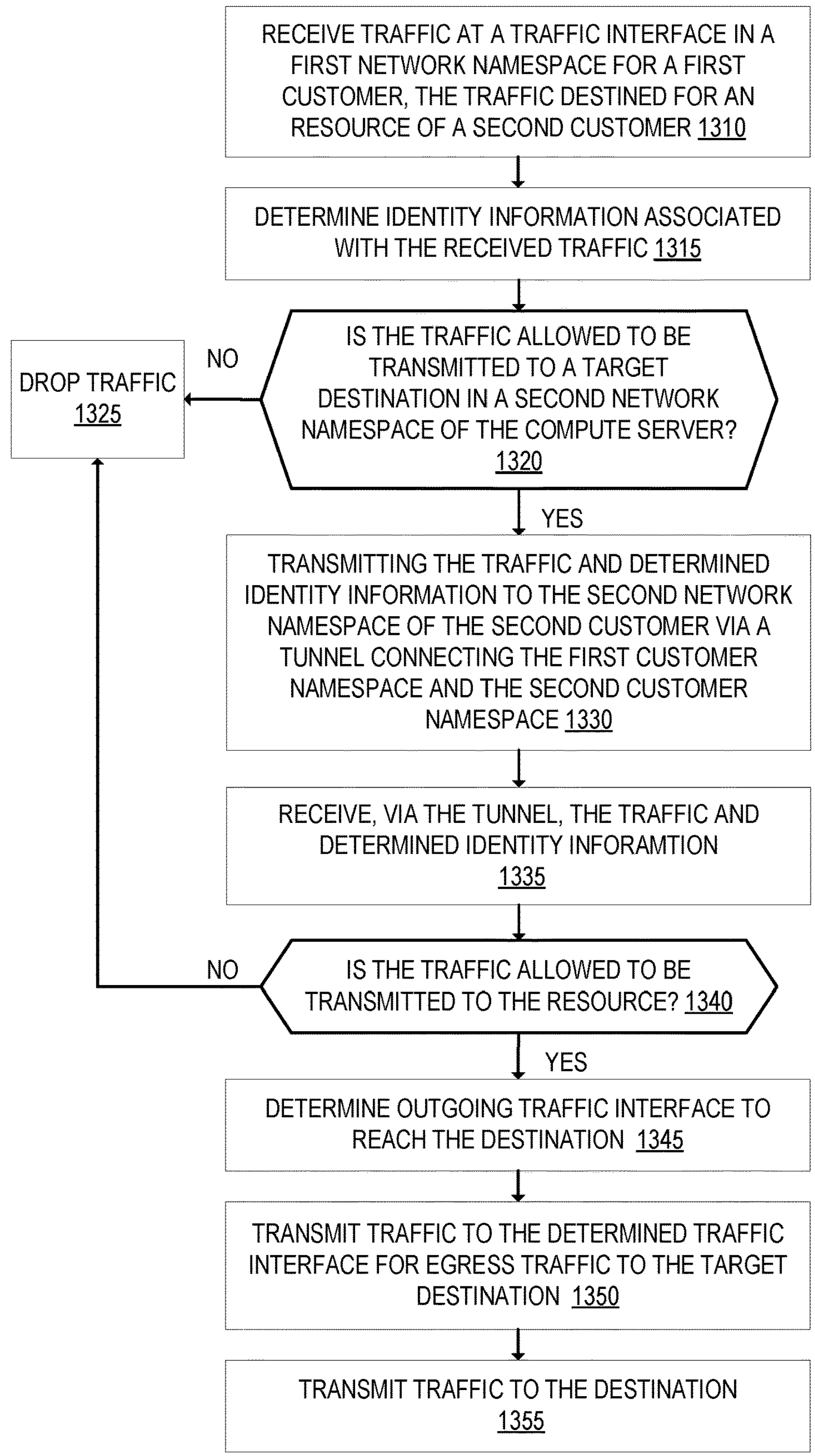
FIG. 13 is a flow diagram that illustrates exemplary operations for processing traffic received from an end user client device associated with a first customer network and that is destined to a private resource or application associated with a second customer network according to an embodiment.

FIG. 13 is a flow diagram that illustrates exemplary operations for processing traffic received from an end user client device associated with a first customer network and that is destined to a private resource or application associated with a second customer network according to an embodiment. The operations of FIG. 13 are described with respect to the exemplary embodiments of FIG. 12. However, the operations of FIG. 13 can be performed by embodiments different from that of FIG. 12, and the embodiments described in reference to FIG. 12 can perform operations different from that of FIG. 13.

At operation 1310, a compute server 1215 receives traffic at a traffic interface 1210A of a first network namespace of a first customer. The traffic interface 1210A may be, for example, an L2/L3 tunnel service like the L2/L3 tunnel service 122, a VPN server like the VPN server 136, or an IPsec tunnel service like the IPsec tunnel service 186. The traffic is received from the client device 1230. The destination of the traffic is a resource (e.g., an application) of a second customer that has a second network namespace at the compute server 1215. A cross-customer tunnel 1250, such as a GRE tunnel, is established between the network namespace of the first customer and the network namespace of the second customer.

Next, at operation 1315, the compute server 1215 determines identity information associated with the received traffic. The determined identity information includes at least an identifier of a customer to which the traffic is attributable. The ingress traffic may be associated with identity of the organization, identity of the client device that transmitted the traffic, and/or identity of the user responsible for transmitting the traffic, as previously described.

The first customer may configure or set a set of egress policies that define criteria for sending traffic from their network to a network of a second customer (e.g., security and/or access policies). For example, the first customer may define an egress policy that specifies only a set of one or more users are allowed to access a resource of the second customer.

At operation 1320, the compute server 1215 determines whether the traffic is allowed to be transmitted to the resource of the second customer. The compute server 1215 applies a set of one or more egress policies configured for the first customer that are applicable for the received traffic and/or the destination. As an example, an egress policy may define that only certain users are allowed to access that destination of the second customer. If the traffic is allowed to be transmitted to the destination, then operation 1330 is performed. If the traffic is not allowed to be transmitted to the destination per the set of egress policies configured for the first customer (e.g., the user of the first customer is not authorized to access the resource of the second customer), then operation 1325 is performed where the compute server 1215 drops the traffic.

At operation 1330, the compute server 1215 transmits the traffic and determined identity information to the second network namespace of the second customer via a tunnel connecting the first customer namespace and the second customer namespace (e.g., via a GRE tunnel). The traffic and determined identity information may be encapsulated according to the tunneling technique.

At operation 1335, the traffic and determined identity information are received at the second customer namespace of the compute server 1215 via the tunnel connecting the first customer namespace and the second customer namespace. At the second customer namespace, the traffic and determined identity information may be decapsulated according to the tunneling technique.

The second customer may configure or set a set of ingress policies that define criteria for sending traffic received from a network of a different customer (e.g., the first customer in this example) and destined to the resource of the second customer (e.g., security and/or access policies). For example, the second customer may define an ingress policy that specifies only a set of one or more users are allowed to access the resource of the second customer. In this example, it is possible that the second customer may define a different set of users than the first customer defined that are allowed to access the resource of the second customer. In such a case, for traffic from a particular user to be transmitted to the resource, that user would need to be included on the set of users defined by the first customer and the set of users defined by the second customer.

At operation 1340, the compute server 1215 determines whether the traffic is allowed to be transmitted to the resource of the second customer. The compute server 1215 applies a set of one or more ingress policies configured for the second customer that are applicable for the received traffic and/or the destination. As an example, an ingress policy may define that only certain users are allowed to access that destination of the second customer. If the traffic is allowed to be transmitted to the destination, then operation 1345 is performed. If the traffic is not allowed to be transmitted to the destination per the set of egress policies configured for the first customer (e.g., the user of the first customer is not authorized to access the resource of the second customer), then operation 1325 is performed where the compute server 1215 drops the traffic.

At operation 1345, the compute server 1215 determines the outgoing traffic interface for the traffic to reach the target destination, which may be on a different compute server. For example, the routing service 1270B accesses the unified network routing store 1212B to determine the outgoing traffic interface for the traffic as previously described. The outgoing traffic interface may be a different kind of traffic interface compared to the incoming traffic interface. For instance, traffic arriving on a GRE tunnel interface may be sent to a layer 7 based tunnel interface to connect to the target destination. As another example, traffic arriving via an agent on an end user client device can be sent to an IPSec tunnel interface.

Next, at operation 1350, the traffic is transmitted to the determined traffic interface for egress traffic to the target destination. Next, at operation 1355, the traffic is transmitted from the determined traffic interface for the egress traffic to the target destination.

It is possible that multiple customers can use overlapping private IP address space. For instance, it is possible that a first customer can have the IP address 10.0.0.1 assigned to one of its applications and a second customer can have the IP address 10.0.0.1 assigned to one of its applications. In such a case, if the first customer wanted to access the second customer's application that runs on 10.0.0.1, then a network address translation (NAT) is performed in one of the customer's namespace. For instance, the first customer may use an IP address that it does not use (e.g., 10.10.10.1) and the second customer may perform a NAT to change packets destined for that not-in-use IP address (e.g., 10.10.10.1) to the IP address of the target application (e.g., 10.0.0.1) for packets in the second customer's namespace. Thus, the first customer connects to the not-in-use IP address (e.g., 10.10.10.1) and packets may enter the second customer's network namespace (assuming policy allows) where they are translated to 10.0.0.1 for accessing the target application.

Figure 14:
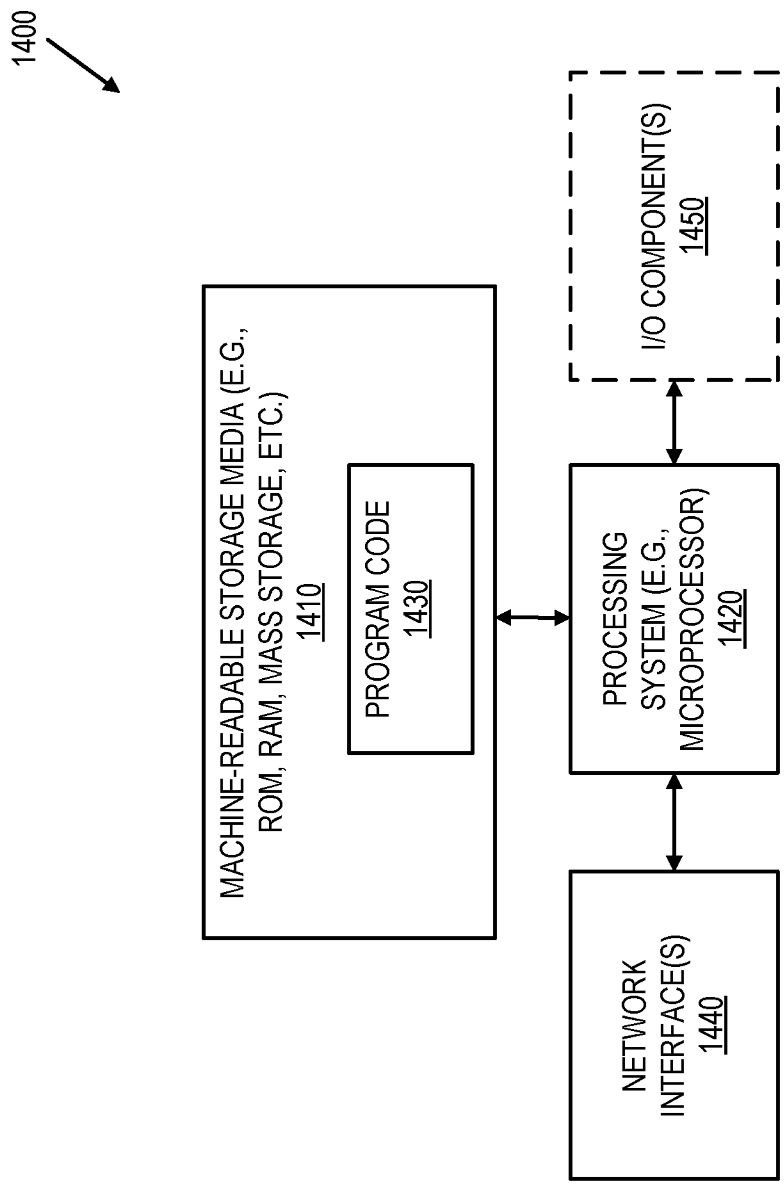
FIG. 14 illustrates a block diagram for an exemplary data processing system that may be used in some embodiment.

FIG. 14 illustrates a block diagram for an exemplary data processing system 1400 that may be used in some embodiments. One or more such data processing systems 1400 may be used to implement the embodiments and operations described with respect to the compute servers or other computing devices. The data processing system 1400 is a computing device that stores and transmits (internally and/or with other computing devices over a network) code (which is composed of software instructions and which is sometimes referred to as computer program code or a computer program) and/or data using machine-readable media (also called computer-readable media), such as machine-readable storage media 1410 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 1420 (e.g., one or more processors and connected system components such as multiple connected chips). For example, the depicted machine-readable storage media 1410 may store program code 1430 that, when executed by the processor(s) 1420, causes the data processing system 1400 to perform any of the operations described herein.

The data processing system 1400 also includes one or more network interfaces 1440 (e.g., a wired and/or wireless interfaces) that allows the data processing system 1400 to transmit data and receive data from other computing devices, typically across one or more networks (e.g., Local Area Networks (LANs), the Internet, etc.). The data processing system 1400 may also include one or more input or output ("I/O") components 1450 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 1400, and, in certain embodiments, fewer components than that shown in One or more buses may be used to interconnect the various components shown in FIG. 14.

The techniques shown in the figures can be implemented using code and data stored and executed on one or more computing devices (e.g., a compute server, a client device, a router, an origin server). Such computing devices store and communicate (internally and/or with other computing devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such computing devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:

receiving traffic at a traffic interface of a compute server, wherein the traffic interface is one of a Generic Routing Encapsulation (GRE) tunnel interface, an encrypted tunnel interface, a Virtual Private Network (VPN) server interface, and an Internet Protocol Security (IPsec) tunnel interface;

determining identity information associated with the traffic, wherein the identity information includes at least an identifier of a first customer to which the traffic is attributable, the first customer having a first isolated network stack at the compute server;

determining, using one or more egress policies configured for the first customer and the identity information, whether the traffic is allowed to be transmitted to a target destination of the traffic, wherein the target destination of the traffic is a resource of a second customer having a second isolated network stack at the compute server;

responsive to determining that the traffic is allowed to be transmitted to the target destination, transmitting the traffic and the identity information to the second isolated network stack;

receiving the traffic at the second isolated network stack at the compute server;

determining, using one or more ingress policies configured for the second customer and the identity information, whether the traffic is allowed to be transmitted to the target destination of the traffic; and responsive to determining that the traffic is allowed to be transmitted to the target destination, transmitting the traffic to the target destination.

2. The method of claim 1, wherein the traffic interface is the VPN server interface, wherein the traffic is received over a VPN tunnel from a VPN client executing on a client device at the VPN server interface, wherein the traffic has a destination IP address that is associated with an IP address of the target destination, wherein the identity information includes information identifying a user of the client device, and wherein determining, using the one or more egress policies configured for the first customer includes determining whether the user is allowed to access the resource of the second customer.

3. The method of claim 1, wherein the traffic interface is the GRE tunnel interface, wherein the traffic is received over a GRE tunnel from a router of an office network of the first customer, wherein the traffic has a destination IP address that is associated with an IP address of the target destination, wherein the identity information includes information identifying the first customer based on the GRE tunnel being associated with an account of the first customer, and wherein determining, using the one or more egress policies configured for the first customer includes determining whether traffic received over the GRE tunnel from the router of the office network of the first customer is allowed to access the resource of the second customer.

4. The method of claim 3, wherein the GRE tunnel interface is assigned an IP address that is an anycast IP address that is shared among a plurality of compute servers of a distributed cloud computing network.

5. The method of claim 1, wherein the traffic interface is the IPsec tunnel interface, wherein the traffic is received over an IPsec tunnel from a router of a private network of the first customer, wherein the traffic has a destination IP address that is associated with an IP address of the target destination, wherein the identity information includes information identifying the first customer based on the IPsec tunnel being associated with an account of the first customer, and wherein determining, using the one or more egress policies configured for the first customer includes determining whether traffic received over the IPSec tunnel from the router of the private network of the first customer is allowed to access the resource of the second customer.

6. The method of claim 5, wherein the IPsec tunnel interface is assigned an IP address that is an anycast IP address that is shared among a plurality of compute servers of a distributed cloud computing network.

7. The method of claim 1, wherein the egress policies configured for the first customer and the ingress policies configured for the second customer define users associated with the first customer allowed to access the resource of the second customer.

8. The method of claim 1, wherein transmitting the traffic to the second isolated network stack comprises:

sending the traffic and the identity information to a routing service;

determining that the target destination is located in the second isolated network stack; and determining that a tunnel connecting the first isolated network stack and the second network isolated stack is an outgoing traffic interface for sending the traffic to the second isolated network stack.

9. A non-transitory machine-readable storage medium that provides instructions that, if executed by a processor, will cause said processor to perform operations including:

receiving traffic at a traffic interface of a compute server, wherein the traffic interface is one of a Generic Routing Encapsulation (GRE) tunnel interface, an encrypted tunnel interface, a Virtual Private Network (VPN) server interface, and an Internet Protocol Security (IPsec) tunnel interface;

determining identity information associated with the traffic, wherein the identity information includes at least an identifier of a first customer to which the traffic is attributable, the first customer having a first isolated network stack at the compute server;

determining, using one or more egress policies configured for the first customer and the identity information, whether the traffic is allowed to be transmitted to a target destination of the traffic, wherein the target destination of the traffic is a resource of a second customer having a second isolated network stack at the compute server;

responsive to determining that the traffic is allowed to be transmitted to the target destination, transmitting the traffic and the identity information to the second isolated network stack;

receiving the traffic at the second isolated network stack at the compute server;

determining, using one or more ingress policies configured for the second customer and the identity information, whether the traffic is allowed to be transmitted to the target destination of the traffic; and responsive to determining that the traffic is allowed to be transmitted to the target destination, transmitting the traffic to the target destination.

10. The non-transitory machine-readable storage medium of claim 9, wherein the traffic interface is the VPN server interface, wherein the traffic is received over a VPN tunnel from a VPN client executing on a client device at the VPN server interface, wherein the traffic has a destination IP address that is associated with an IP address of the target destination, wherein the identity information includes information identifying a user of the client device, and wherein determining, using the one or more egress policies configured for the first customer includes determining whether the user is allowed to access the resource of the second customer.

11. The non-transitory machine-readable storage medium of claim 9, wherein the traffic interface is the GRE tunnel interface, wherein the traffic is received over a GRE tunnel from a router of an office network of the first customer, wherein the traffic has a destination IP address that is associated with an IP address of the target destination, wherein the identity information includes information identifying the first customer based on the GRE tunnel being associated with an account of the first customer, and wherein determining, using the one or more egress policies configured for the first customer includes determining whether traffic received over the GRE tunnel from the router of the office network of the first customer is allowed to access the resource of the second customer.

12. The non-transitory machine-readable storage medium of claim 11, wherein the GRE tunnel interface is assigned an IP address that is an anycast IP address that is shared among a plurality of compute servers of a distributed cloud computing network.

13. The non-transitory machine-readable storage medium of claim 9, wherein the traffic interface is the IPsec tunnel interface, wherein the traffic is received over an IPsec tunnel from a router of a private network of the first customer, wherein the traffic has a destination IP address that is associated with an IP address of the target destination, wherein the identity information includes information identifying the first customer based on the IPsec tunnel being associated with an account of the first customer, and wherein determining, using the one or more egress policies configured for the first customer includes determining whether traffic received over the IPSec tunnel from the router of the private network of the first customer is allowed to access the resource of the second customer.

14. The non-transitory machine-readable storage medium of claim 13, wherein the IPsec tunnel interface is assigned an IP address that is an anycast IP address that is shared among a plurality of compute servers of a distributed cloud computing network.

15. The non-transitory machine-readable storage medium of claim 9, wherein the egress policies configured for the first customer and the ingress policies configured for the second customer define users associated with the first customer allowed to access the resource of the second customer.

16. The non-transitory machine-readable storage medium of claim 9, wherein transmitting the traffic to the second isolated network stack comprises:

sending the traffic and the identity information to a routing service;

determining that the target destination is located in the second isolated network stack; and determining that a tunnel connecting the first isolated network stack and the second network isolated stack is an outgoing traffic interface for sending the traffic to the second isolated network stack.

17. A compute server, comprising:

a processor; and a non-transitory machine-readable storage medium that provides instructions that, if executed by the processor, will cause the server to perform operations including:

receiving traffic at a traffic interface of the compute server, wherein the traffic interface is one of a Generic Routing Encapsulation (GRE) tunnel interface, an encrypted tunnel interface, a Virtual Private Network (VPN) server interface, and an Internet Protocol Security (IPsec) tunnel interface;

determining identity information associated with the traffic, wherein the identity information includes at least an identifier of a first customer to which the traffic is attributable, the first customer having a first isolated network stack at the compute server;

determining, using one or more egress policies configured for the first customer and the identity information, whether the traffic is allowed to be transmitted to a target destination of the traffic, wherein the target destination of the traffic is a resource of a second customer having a second isolated network stack at the compute server;

responsive to determining that the traffic is allowed to be transmitted to the target destination, transmitting the traffic and the identity information to the second isolated network stack;

receiving the traffic at the second isolated network stack at the compute server;

determining, using one or more ingress policies configured for the second customer and the identity information, whether the traffic is allowed to be transmitted to the target destination of the traffic; and responsive to determining that the traffic is allowed to be transmitted to the target destination, transmitting the traffic to the target destination.

18. The server of claim 17, wherein the traffic interface is the VPN server interface, wherein the traffic is received over a VPN tunnel from a VPN client executing on a client device at the VPN server interface, wherein the traffic has a destination IP address that is associated with an IP address of the target destination, wherein the identity information includes information identifying a user of the client device, and wherein determining, using the one or more egress policies configured for the first customer includes determining whether the user is allowed to access the resource of the second customer.

19. The server of claim 17, wherein the traffic interface is the GRE tunnel interface, wherein the traffic is received over a GRE tunnel from a router of an office network of the first customer, wherein the traffic has a destination IP address that is associated with an IP address of the target destination, wherein the identity information includes information identifying the first customer based on the GRE tunnel being associated with an account of the first customer, and wherein determining, using the one or more egress policies configured for the first customer includes determining whether traffic received over the GRE tunnel from the router of the office network of the first customer is allowed to access the resource of the second customer.

20. The server of claim 19, wherein the GRE tunnel interface is assigned an IP address that is an anycast IP address that is shared among a plurality of compute servers of a distributed cloud computing network.

21. The server of claim 19, wherein the traffic interface is the IPsec tunnel interface, wherein the traffic is received over an IPsec tunnel from a router of a private network of the first customer, wherein the traffic has a destination IP address that is associated with an IP address of the target destination, wherein the identity information includes information identifying the first customer based on the IPsec tunnel being associated with an account of the first customer, and wherein determining, using the one or more egress policies configured for the first customer includes determining whether traffic received over the IPSec tunnel from the router of the private network of the first customer is allowed to access the resource of the second customer.

22. The server of claim 21, wherein the IPsec tunnel interface is assigned an IP address that is an anycast IP address that is shared among a plurality of compute servers of a distributed cloud computing network.

23. The server of claim 21, wherein the egress policies configured for the first customer and the ingress policies configured for the second customer define users associated with the first customer allowed to access the resource of the second customer.

24. The server of claim 19, wherein transmitting the traffic to the second isolated network stack comprises:

sending the traffic and the identity information to a routing service;

determining that the target destination is located in the second isolated network stack; and determining that a tunnel connecting the first isolated network stack and the second network isolated stack is an outgoing traffic interface for sending the traffic to the second isolated network stack.

* * * * *